(12) United States Patent
Mohan et al.

(10) Patent No.: US 11,502,894 B2
(45) Date of Patent: Nov. 15, 2022

(54) PREDICTING PERFORMANCE OF A NETWORK ORDER FULFILLMENT SYSTEM

(71) Applicant: ACCENTURE GLOBAL SOLUTIONS LIMITED, Dublin (IE)

(72) Inventors: Mahesh Kumar Mohan, Harris Park (AU); Madan Kumar, Bangalore (IN); Harshit Kumar, Parramatta (AU)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 94 days.

(21) Appl. No.: 17/094,491

(22) Filed: Nov. 10, 2020

(65) Prior Publication Data
US 2022/0150104 A1    May 12, 2022

(51) Int. Cl.
*H04L 41/0631* (2022.01)
*G06N 20/00* (2019.01)
(Continued)

(52) U.S. Cl.
CPC .......... *H04L 41/0645* (2013.01); *G06N 5/04* (2013.01); *G06N 20/00* (2019.01); *H04L 41/0654* (2013.01); *H04L 43/08* (2013.01)

(58) Field of Classification Search
CPC . H04L 41/0645; H04L 41/0654; H04L 43/08; G06N 20/00; G06N 5/04
(Continued)

(56) References Cited

U.S. PATENT DOCUMENTS

| 7,568,023 B2 * | 7/2009 | Green | H04L 43/028 709/224 |
| 8,359,378 B2 * | 1/2013 | Kudo | H04L 43/065 709/212 |

(Continued)

FOREIGN PATENT DOCUMENTS

| EP | 1065827 A1 | 1/2001 |
| EP | 3312725 A2 | 4/2018 |

OTHER PUBLICATIONS

Moghaddam et al., "Performance-Aware Management of Cloud Resources: A Taxonomy and Future Directions", ACM Computing Surveys, vol. 52, Issue 4, Article 84, (Aug. 2019), 37 pages.

*Primary Examiner* — Anh Nguyen
*Assistant Examiner* — John Fan
(74) *Attorney, Agent, or Firm* — Mannava & Kang, P.C.

(57) ABSTRACT

A system may monitor transaction data pertaining to a plurality of transaction types received by a network order fulfillment system. The system may classify the transaction data into a plurality of alarm types based on pre-defined impact of an alarm type to a given transaction type. The system may analyze a plurality of performance parameters influencing a performance of the network order fulfillment system, and identify a performance parameter exhibiting an anomaly based on historical data, a current status of the plurality of the performance parameters and a predefined prediction model. The system may ascertain whether the identified performance parameter negatively impacts the performance of the network order fulfillment system, based on evaluation rules. The system may proactively implement a remediation action to remediate a potential fault caused by the identified performance parameter when the identified performance parameter negatively impacts the performance of the network order fulfillment system.

20 Claims, 13 Drawing Sheets

(51) Int. Cl.
  *G06N 5/04*       (2006.01)
  *H04L 41/0654*    (2022.01)
  *H04L 43/08*      (2022.01)

(58) Field of Classification Search
  USPC ........................................................ 709/224
  See application file for complete search history.

(56) References Cited

U.S. PATENT DOCUMENTS

| | | |
|---|---|---|
| 9,516,053 B1 | 12/2016 | Muddu et al. |
| 2015/0309831 A1* | 10/2015 | Powers ................... H04L 67/10 718/1 |
| 2017/0277531 A1* | 9/2017 | McGrath ............... G06F 9/5083 |
| 2019/0333001 A1 | 10/2019 | Chandra et al. |
| 2019/0339688 A1* | 11/2019 | Cella .................. G05B 23/0229 |

\* cited by examiner

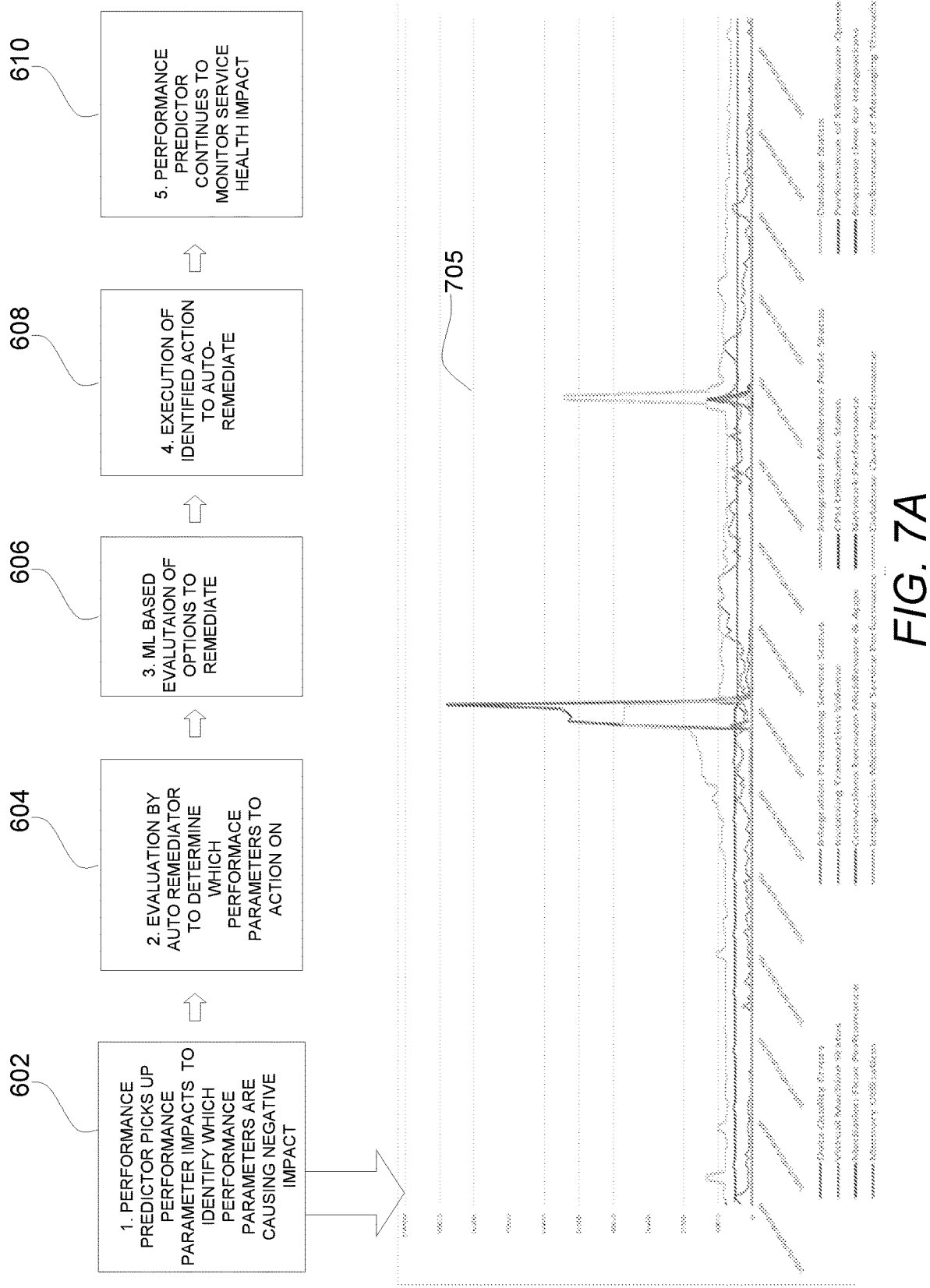

PREDICTING PERFORMANCE OF A NETWORK ORDER FULFILLMENT SYSTEM

BACKGROUND

Available network based systems suffer from downtime or performance issues time to time. For example, in a network based system, when a user intends to perform a transaction, the user may experience system latency, or any another type of issue, such as, for example, a computational error, or a malfunction of one or more platforms within the network based system that does not allow the user to complete the transaction on the network based system, thereby negatively impacting user experience.

In some cases, when an issue arises with a service provided by the network based system, service technicians may be required to manually locate the faults that may be causing these issues within the network based system. Undertaking such tasks manually for resolving the issues may be time-consuming, cumbersome, and tedious; especially when the network based system has multiple platforms that may need to run concurrently with each other for successfully executing a series of operations in order to complete a transaction requested by the user.

With advancement of technology, modern day network based systems may use one or more diagnostic applications embedded therein to help locate or detect faults within the network based system. However, despite implementation of these diagnostic applications, network based systems continue to suffer from several drawbacks, for instance, locating or detecting a fault generally does not precede an occurrence of the fault, i.e., most of available diagnostic applications work on a reactive approach as opposed to a prognostic approach. Consequently, substantial time and resources, computational and manual, may be lost in trying to resolve the issue with a diagnostic approach. Therefore, the use of such an approach may still lead to downtimes during which the network based system may not function as intended and may not be able to perform one or more operations for helping the user complete a desired transaction.

In addition, other currently available approaches lack the ability to forecast the different types of faults and, therefore, cannot possibly predict any fault in system performance of a network based system. Accordingly, a technical problem with the currently available approaches for performing fault detections and subsequent problem resolutions is that these approaches are ineffective in avoiding, or at least mitigating, the possibility of downtimes occurring in the network based system. Moreover, applications using these conventional approaches lack the intelligence to make decisions for problem resolution in cases of faults in system performance. Hence, there is a need for a system that predicts system performance so that any potential fault in the network based system may be known ex ante i.e., detected before the fault in the system performance of the network based system occurs. In addition, there is a need for a system that intelligently performs problem resolution such that the potential fault in the system performance of the network based system is avoided from occurring in real time or in the near future as well.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIGS. 7A-D illustrate a functioning of the system, according to an example embodiment of the present disclosure.

DETAILED DESCRIPTION

Figure 1:
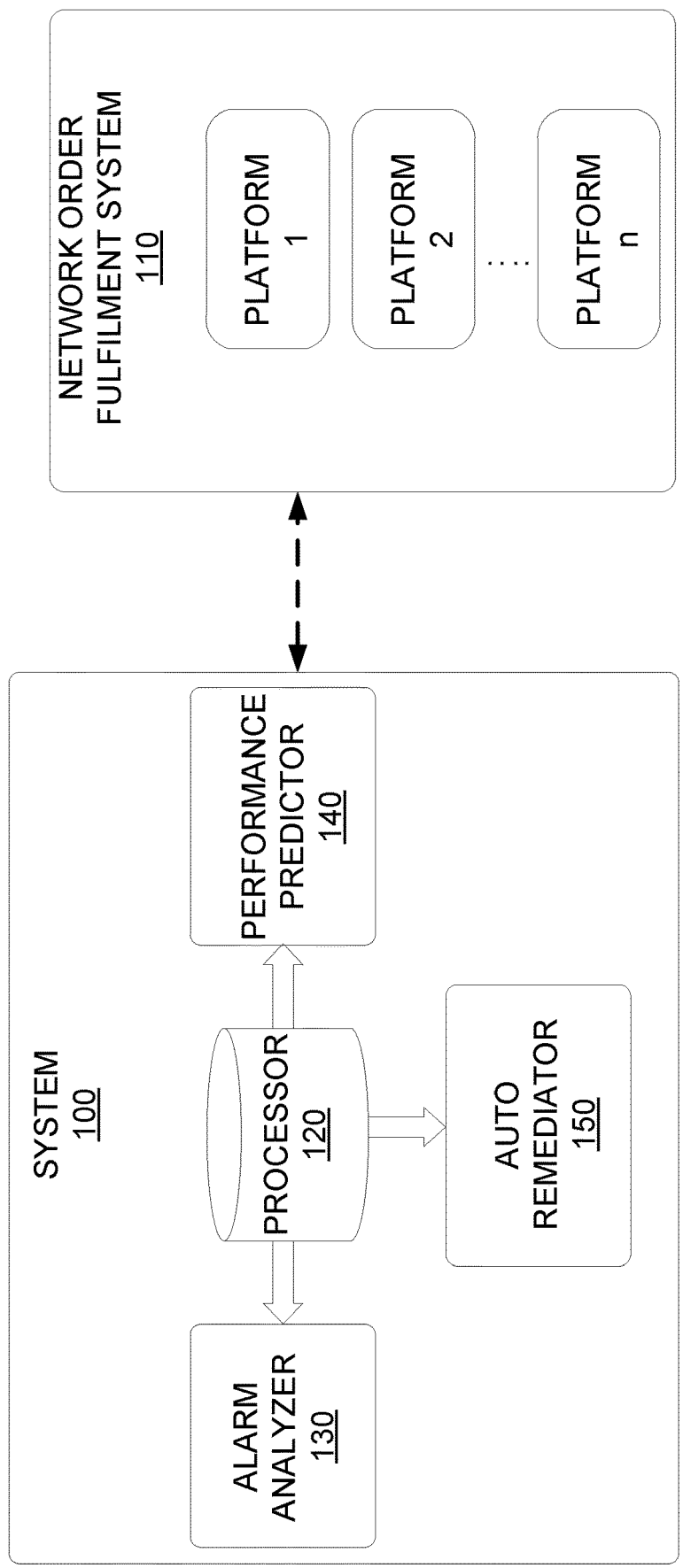
FIG. 1 illustrates a block diagram of a system for predicting performance of a network order fulfillment system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for predicting performance of a network order fulfillment system. The network order fulfillment system may have a multi-platform configuration for fulfilling network tasks, such as customer orders, requests, and transactions. The system may be integrated with the network order fulfillment system or may be external to the network order fulfillment system. The system may be used to provide a prediction of future system performance or a current health status of the system, and proactively remediate various types of potential faults in the network order fulfillment system. The system may predict future system performance based on transaction data received by the network order fulfillment system. The transaction data may include details pertaining to transactions with customers. The transactions may be classified into a plurality of transaction types. For example, one type of transaction data obtained from an interaction with a customer may include a transaction pertaining to the customer attempting to register fora broadband connection.

The present system may classify the transaction data, which may be customer driven, into a plurality of alarm types based on a pre-defined impact of an alarm type to a given transaction type. In the above example, if the customer has initiated the request for the broadband connection, but a designated portal of the network order fulfillment system has failed to log or register the request, then the present system may classify such transaction data into one or more specific alarm types. The alarm types may include, for example, a message queuing alarm, a mediation flow alarm, a service application alarm, a middleware application alarm, a database alarm, a system parameter alarm, or an application integration and connection alarm, but is not limited thereto. A classification of the alarm types may depend on a type of fault that may have occurred within the network order fulfillment system when performing a specific type of transaction. Moreover, a type of transaction may pertain to a type of request made by a user, or customer, to the network order fulfillment system. For instance, one type of transaction pertaining to a specific type of request, for example, a broadband connection request may include transaction data, for example, messaging queues that may be classified into one or more alarm types. In this manner, the present system provides for effective diagnosis of faults in the network order fulfillment system by associating one or more alarm types with a corresponding specific type of the received transaction data.

The system of the present disclosure may include, among other components, a processor, an alarm analyzer, a performance predictor, and an auto remediator, each of which may be coupled to, i.e., disposed in independent communication with the processor. The alarm analyzer may monitor the transaction data received by a network order fulfillment system and classify the customer driven transaction data into the plurality of alarm types. In an example, a volume of incoming transactions and a live status of events, i.e., transaction data are monitored. The events monitored are polled every minute and streamed as live alarms into the alarm analyzer cleanses and groups alarm data for processing. Thus, based on monitoring, a real-time status of the transaction data may be determined to classify the transaction data into a plurality of alarm types, the classification being based on a pre-defined impact of an alarm type to a given transaction type.

The performance predictor may analyze a plurality of performance parameters corresponding to the transaction data, a performance parameter being a parameter influencing a performance of the network order fulfillment system. Further, the performance predictor may identify a performance parameter exhibiting an anomaly, based on historical data, a current status of the plurality of the performance parameters, and a predefined prediction model. For example, if an order receiving portal of the network order fulfillment system is taking too long to respond i.e., low response speed or sub-optimal performance, the performance predictor may identify that a level of system latency is the performance parameter that may be exhibiting the anomaly. This identification may be done by the performance predictor based on, inter alia, historical data, which includes data pertaining to previous transactions and issues available to the present system. The performance predictor may identify the performance parameters exhibiting such anomalies by comparing the current status of the performance parameter with those available in historical data and a prediction model.

In an embodiment, the plurality of performance parameters may include an integration middleware node status, an integration middleware service status, a connection status of integration processing server with messaging queues, a software platform virtual machine status, a database status, a database query performance status, a database connectivity status, a performance of messaging threads between various technology platform components, a CPU utilization status, a memory utilization status, a response time for integrations between various platforms or applications within the platform, a connection status between an application and a database, a connection status between a middleware and applications, connection faults between network and a database, a mediation flow status and performance, data related issues stemming from the transaction data, a quality of data in the database, a performance of the middleware queues, and a middleware message transmission status. Although some examples of performance parameters have been disclosed herein, one of ordinary skill in the art will appreciate that various other types of performance parameters may also be used to predict the performance of the network order fulfillment system without departing from the scope of the present disclosure.

Further, a predefined prediction model may be implemented to identify the anomalous performance parameter from within the plurality of performance parameters. In an embodiment, the performance predictor may implement at least one of a decision tree generation technique, a Random Forest technique, and a C4.5 technique combined with a regression based prediction approach to predict the anomalous performance parameter from within the plurality of performance parameters. Although the decision tree generation technique, the Random Forest technique, and the C4.5 techniques have been disclosed herein, a type of predefined prediction model used to predict the anomalous performance parameter is not to be construed as being limiting of the present disclosure in any way. Rather, one of ordinary skill in the art will appreciate that various other techniques may be implemented for use in addition to, or in lieu of, one or more of the techniques disclosed herein depending upon specific system and application requirements.

In an embodiment, the performance predictor may implement the Random Forest technique to construct the predefined prediction model, implement a linear regression technique to predict an alarm value for each of the plurality of the performance parameters, and implement the C4.5 technique to generate a decision tree for each of the plurality of the performance parameters. Further, the performance predictor may determine a performance score for service applications of the network order fulfillment system, i.e., across the entire scope of service fulfillment technology platform. The performance score is based on a weighted majority voting of the plurality of performance parameters, the weighted majority voting being based on outputs on the decision tree for each of the plurality of the performance parameters. Furthermore, the performance predictor may determine that the performance is being negatively impacted when the performance score is less than a threshold score, and identify the performance parameter from the plurality of performance parameters exhibiting the anomaly, based on a corresponding alarm value. The alarm value may be dynamically varied by the performance predictor based on a continuous real-time input of current transaction data received by the network order fulfillment system that manifests itself into historical data with the passage of time. The alarm value may also be used by the performance predictor for identifying additional performance parameters that may exhibit anomalies.

The auto remediator may ascertain whether the identified performance parameter negatively impacts the performance of the network order fulfillment system, based on evaluation rules. The predefined rules may be dynamic and may be defined by a machine learning model, for instance, using regression trees and customizing the technique for parameter identification. When the identified performance parameter negatively impacts the performance of the network order fulfillment system, the auto remediator may proactively implement a remediation action to remediate a potential fault that may be caused by one or more of identified performance parameter. In an embodiment, the auto remediator may implement a machine learning (ML) based evaluation model to evaluate a plurality of remediation action options available to remedy the potential fault. In an example, the ML based evaluation model may include a linear regression technique in which remediation action options that are, for example, quickest to implement for achieving the best possible outcome i.e., remediation of the potential error may be implemented. In another example, the auto remediator may be provided with a rule-based list of remediation actions. In this example, each type of remediation action, as defined by a corresponding rule, may be adopted for execution by the auto remediator for a specific type of fault that may be caused to occur, by the identified anomalous performance parameter, within the network order fulfillment system.

The present disclosure may predict potential downtimes of a network order fulfillment system and take appropriate remedial measures in a proactive manner i.e., before the downtime, sub-optimal or degraded system performance of the network order fulfillment system occurs. Consequently, the present disclosure may help ensure an efficient and optimal system performance of the network order fulfillment system. Furthermore, the present disclosure also aims to provide a system that may be fine-tuned by combining data, for example, transaction data from past historical periods as well as current incoming transaction data, or by including additional performance parameters to an existing list of performance parameters based on changes or improvements to the network order fulfillment system configuration. Moreover, the present disclosure also aims to provide an improved system for predicting the performance of the network order fulfillment system by implementing various machine learning (ML) techniques, artificial intelligence (AI) techniques, and deep neural network techniques on the combined data in a scalable and efficient manner.

FIG. 1 illustrates a system 100 for predicting performance of a network order fulfillment system 110. In an example, the network order fulfillment system 110 may provide for fulfilling requests made by users of a network service provider, such as a broadband service provider. The requests may pertain to, for example, initiating an installation of a broadband connection from the network service provider. In another example, the request may include modifying or canceling a previously made request. In yet other examples, a type of these requests may vary from querying a status of previously made requests, or re-scheduling a nature or type of the request itself. In an example, the network order fulfillment request may be configured to accept requests made by a user through various modes of online communication channels including, but not limited to, mobile applications, an online portal commissioned at a store having a physical location, a tele-calling service, short messaging service (SMS), a social media platform, a smart device operating under Internet of Things (IoT), and the like.

Further, the network order fulfillment system 110 may, for example, exhibit a multi-platform configuration, i.e., may include at least two or more computational platforms therein. In an example, the network order fulfillment system 110 may include a first platform comprising one or more systems of trust for performing, amongst other things, management i.e., authentication/validation of an identity or access rights of the user. The first platform may also be configured to perform functions that are consistent with that of data security, fraud management, and compliance management, but is not limited thereto.

Additionally, or optionally, the network order fulfillment system 110 may include a second platform having one or more systems for engagement, for example, a digital experience platform that is directed to providing or enhancing the user's experience when using, for example, making requests to the network order fulfillment system 110. Further, another system for engagement within the second platform may include, for example, an-omni channel engine having one or more sub-systems therein for performing functions related to content management, media content delivery, commerce, order capturing, personalization, digital marketing and the like. Furthermore, yet another system for engagement within the third platform may include, for example, an application protocol interface (API) gateway.

Additionally, or optionally, the network order fulfillment system 110 may include a fourth platform in the form of one or more systems of insight, for example, a digital cockpit system, a system for performing social sentiment analysis, another system for performing customer journey analysis, a monetization engine for performing analysis for monetization through advertising, yet another system for performing sales analysis, customer record analysis and other allied functions.

Additionally, or optionally, the network order fulfillment system 110 may comprise a fifth platform having one or more systems of record therein. These systems of record may comprise various sub-systems for performing functions including, but not limited to, marketing and sales, retail, customer account and interaction management, commercial order management, enterprise product catalogue management, billing, product/service rating and policy management, enterprise resource planning (ERP) and management, enterprise application management, operational support and readiness management, and the like.

Although the system 100 of the present disclosure will be explained in conjunction with some functions pertaining to the operational support and readiness management of the network order fulfillment system 110, it should be noted that functionalities of the system 100 described herein is not limited thereto. The system 100 and its associated functionalities are described herein only to aid a reader's understanding of the same. Accordingly, a scope of the present disclosure is to be understood as being defined by the claims appended herein.

The system 100 may include a processor 120, and an alarm analyzer 130 coupled to the processor 120, a performance predictor 140 coupled to the processor 120, and an auto remediator coupled to the processor 120. The alarm analyzer 130 may monitor transaction data received by the network order fulfillment system 110. The transaction data may include transactions pertaining to a plurality of transaction types. In an example, the transaction data may include data relating to service fulfillment requests. Such service fulfillment requests may relate to managing appointments, managing addresses, managing qualifications of service provisioning and product orders, but is not limited thereto.

The transaction data pertaining to the service fulfillment requests of managing appointments may include, for example, querying availability for a first appointment for an agent's visitation at a physical location of the user, creating the first appointment, rescheduling the first appointment, querying a second appointment for establishing a broadband connection, amending the second appointment, canceling the second appointment. The transaction data pertaining to the service fulfillment requests of managing addresses may include, for example, querying the address at which the user wishes to install one or more broadband connections. The transaction data pertaining to the service fulfillment requests of managing qualifications of service provisioning may include, for example, determination of site qualification, and determination of order feasibility. The transaction data pertaining to the service fulfillment requests of managing product orders may include, for example, creating orders, modifying orders, disconnecting orders, creating comments pertaining to one or more orders, requesting additional time for installation of the one or more broadband connections, amending orders, querying order status, resuming orders, cancelling orders, performing bulk orders, and querying a product instance in which transactions are spawned to retrieve broadband plan related details that a user has placed as via an order.

The alarm analyzer 130 may classify the transaction data, also referred to as customer driven transaction data, into a plurality of alarm types, based on a pre-defined impact of an alarm type to a given transaction type. The pre-defined impact may be studies based on previous errors and may be stored in data, such as historical data associated with the network order fulfillment system 110. In an example, the alarm analyzer 130 may be communicably disposed with, or integrated with, one or more platform components of the network order fulfillment system 110 including, but not limited to, middleware applications, messaging queues, application services, databases, application integrations and connections, mediation flows, inbound transaction data, and master data. Details related to the classification of transaction data into corresponding alarm types is explained in detail with reference to description of FIGS. 2A, 2B, and 3.

In an example embodiment, a user may interact with the network order fulfillment system 110 that is coupled to the system 100 to provide a request, for instance, a query pertaining to broadband details, and the alarm analyzer 130 of the system 100 may intelligently process this request to obtain the transaction data received from the network order fulfillment system 110 pertaining to the type of request made by the user for subsequently monitoring the received transaction data.

The performance predictor 140 may analyze a plurality of performance parameters that correspond to the transaction data received by the network order fulfillment system 110 and that which may influence a performance of the network order fulfillment system 110. The performance predictor 140 may further identify a performance parameter that exhibits an anomaly based on historical data, a current status of each performance parameter from the plurality of the performance parameters, and a predefined prediction model. The performance predictor 140 may obtain, for use, the historical data from a database (not shown) associated with the network order fulfillment system 110. Alternatively, such database may form part of, or be coupled with i.e., be disposed in communication with, the performance predictor 140 of the system disclosed herein.

The auto remediator 150 may ascertain whether the identified performance parameter negatively impacts the performance of the network order fulfillment system 110. For ascertaining whether the identified performance parameter negatively impacts the performance of the network order fulfillment system 110, the auto remediator 150 may do so on the basis of one or more evaluation rules. A type of the evaluation rules used by the auto remediator 150 may vary based on, for example, the identified performance parameter and a corresponding anomaly associated with the identified performance parameter. In addition, the auto remediator 150 may proactively implement a remediation action to remediate a potential error caused by the identified performance parameter when the identified performance parameter negatively impacts the performance of the network order fulfillment system 110. Details pertaining to various other aspects and functionalities of the system 100 are provided with respect to subsequent figures.

Figure 2A:
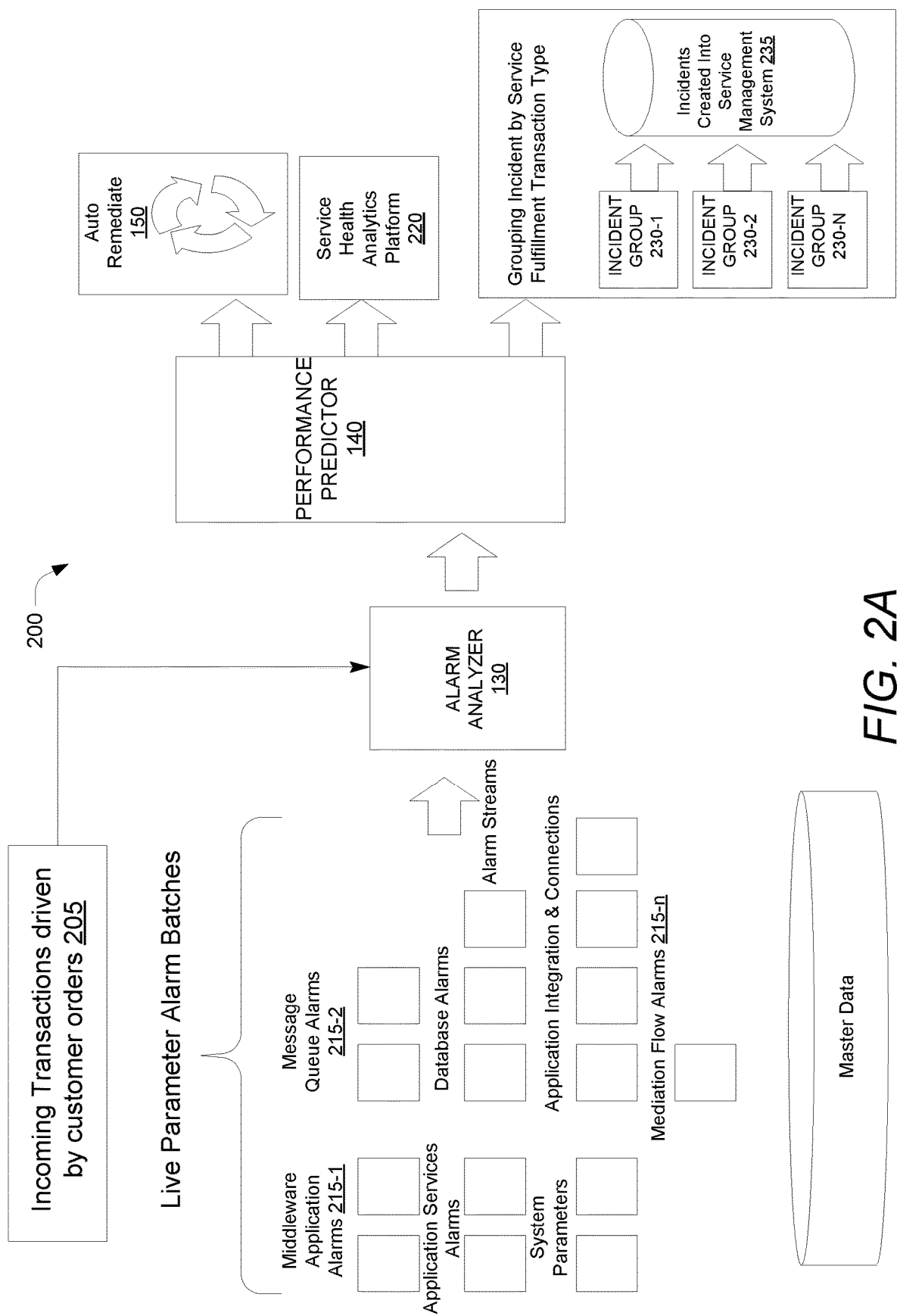
FIG. 2A illustrates a schematic diagram of the system of FIG. 1, according to an example embodiment of the present disclosure.
Figure 2B:
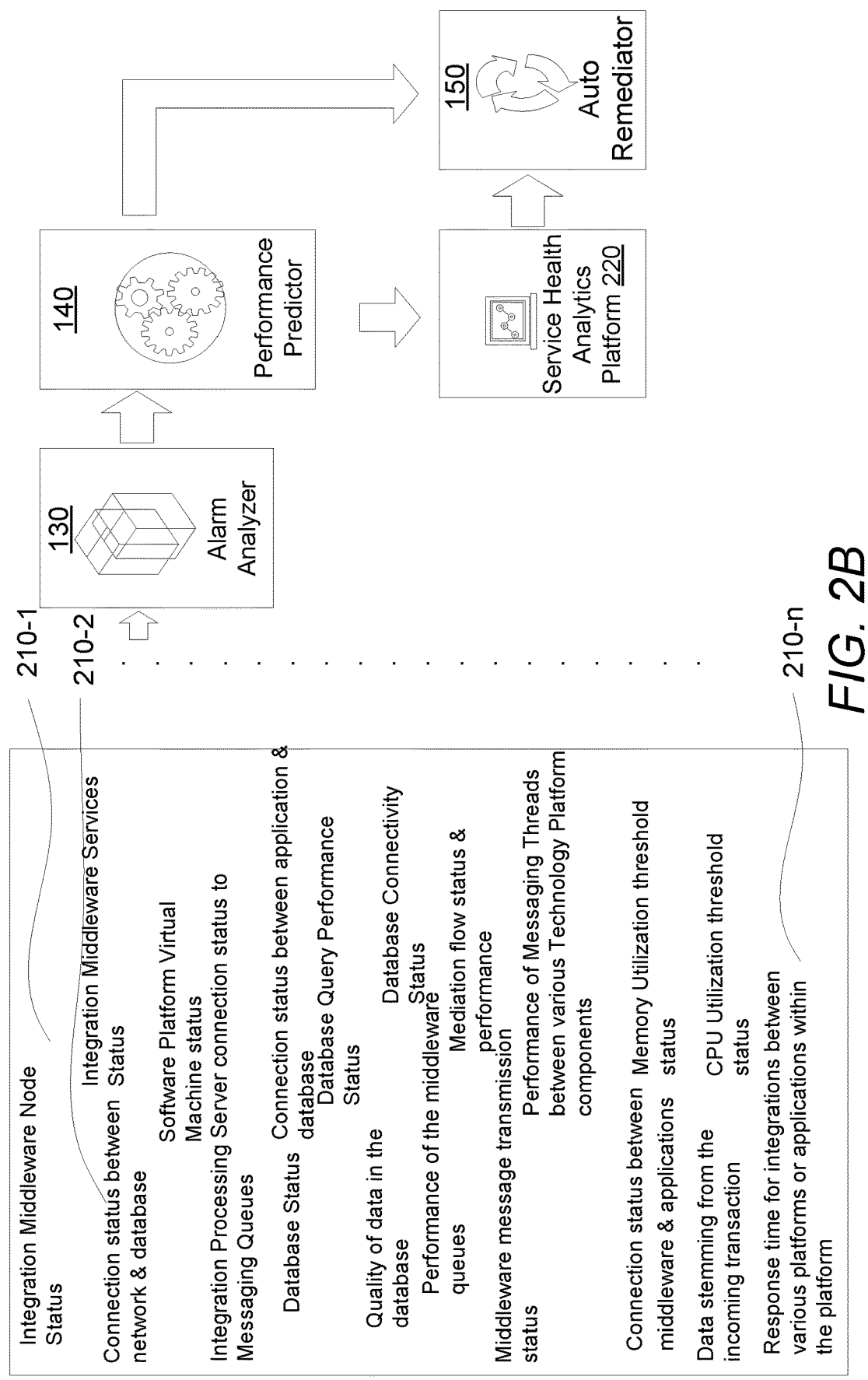
FIG. 2B illustrates various performance parameters employed by the system of FIG. 1 for predicting the performance of the network order fulfillment system, according to an example embodiment of the present disclosure.

Referring to FIGS. 2A and 2B, various components of the system 100 are illustrated, and particularly, the aspects and functionalities of the alarm analyzer 130, according to an example embodiment of the present disclosure are described. The alarm analyzer 130 may comprise stored alarms that have been previously grouped and classified from historical data i.e., historical transaction data into a plurality of batches. The alarm analyzer 130 may receive the transaction data including incoming transactions driven by customer orders as indicated by arrow 205 as indicated in FIG. 2A. Further, status of various performance parameters pertaining to the transaction data may also be received. As shown in the view of FIG. 2B, some examples of the statuses of performance parameters may include, but is not limited to, an integration middleware node status 210-1, a connection status between network and database 210-2, an integration middleware services status, a software platform virtual machine status, a status of an integration processing server connection to message queues, a database status, a status of a connection between application and database, a quality status of data in the database, a database connectivity status, a mediation flow and performance status, a status associated with performance of the middleware queues, a status of middleware message transmission, a performance status of messaging threads between various technology platform components of the network order fulfillment system 110, a connection status between middleware and applications, a memory utilization and threshold status, a status of data stemming from the incoming transaction, a CPU utilization and threshold status, and a response time for integrations between various platforms or service applications within the platforms 210-*n*.

In another example, the system may also include a discovery element (not shown in figures), which may be machine learning driven where the performance predictor 140 may not only work with predefined set of parameters but also discover new parameters impacting system health. As and when new data is received by the system 100 and the performance of the system 100 is analyzed, new parameters impacting system performance/health may be identified and used for future analysis.

The parameters may also be grouped in various alarm batches as illustrated in FIG. 2A. The alarm batches may be classified and grouped based on impact of parameters as middleware application alarms 215-1, message queue alarms 215-2, application services alarms, database alarms, alarms pertaining to system parameters, alarms pertaining to application integration and connections, and mediation flow alarms 215-*n*. Although some examples of alarm batches have been disclosed herein, it should be noted that such alarm batches are to be construed as non-limiting of this disclosure. It will be appreciated by a person of ordinary skill in the art that various other types/groups of alarm batches may be implemented for use by the alarm analyzer 130 depending on specific system and application requirements.

In an example embodiment, the alarm analyzer 130 may also analyze the transaction data to determine a volume of incoming transactions. In addition, the alarm analyzer 130 may also analyze a real-time status of each of the plurality of the performance parameters that are associated with the transaction data being monitored as mentioned above and may perform alarm batch grouping. These statuses may be provided to the alarm analyzer 130, which as mentioned above, may analyze this alarm data along with the transaction data.

The performance predictor 140 may identify performance parameters that may be adversely impacting health or performance of the network order fulfillment system 110. The performance predictor 140 may implement a customized technique developed based on the Regression Tree algorithm. The output of the performance predictor 140 may presents the service fulfillment health or the performance of the network order fulfillment system 110 in a digital dashboard. The health indicator may be in the form of a score, which may be assessed to determine if there is a probability in next predetermine time duration, say, the next 30 minutes, of the health degrading to the point where transaction processing will be suboptimal.

In an example, the performance predictor 140 may be coupled to a system health analytics platform 220, which may analyze health of each of the performance parameters. Although, system health analytics platform 220, has been illustrated extremal to performance predictor 140, it may be integrated with the performance predictor 140 as well. The system health analytics platform 220 may assist the performance predictor 140 to group anomalies that may cause suboptimal performance of the network order fulfillment system 110 into various incidents, such as an incident group 230-1, an incident group 230-2, . . . an incident group 230-N, which may be stored in a service management system 235. The incidents may be grouped by transaction type causing the service health degradation with a view not to flood the system 100 with many incidents pointing to the same fault type. The auto remediator 150 monitors the service management system for service health degradation related faults and use a variety of predefined automated strategies to recover the service health before the user experiences degraded system performance.

Figure 3:
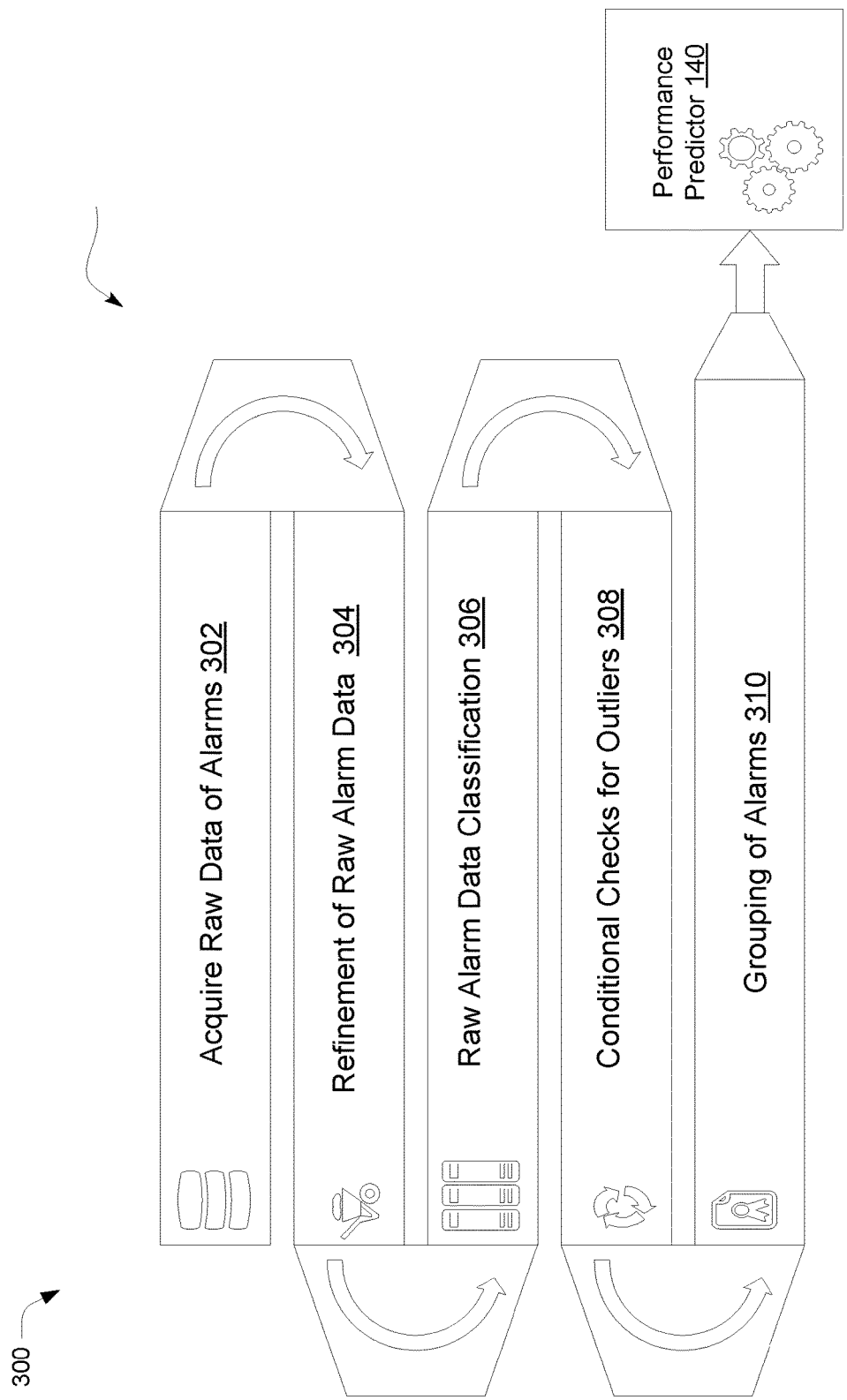
FIG. 3 illustrates an example alarm data cleansing and grouping process by the system of FIG. 1, according to an example embodiment of the present disclosure.

FIG. 3 illustrates an example alarm data cleansing and grouping process 300 by the alarm analyzer 130, according to an example embodiment of the present disclosure. At step 302, the alarm analyzer 130 may acquire raw data of alarms. Raw alarm data may be understood as data that is picked up by software probes or sensors. The raw data may not be cleansed data and may be subject to the vagaries (such as some elements being missing, data in the extreme limits), which are subsequently cleansed by the alarm analyzer 130. In this step 302, the alarm analyzer 130 may gather alarm data from identified components of platforms within the network order fulfillment system 110 and related events of performance parameters. At step 304, the alarm analyzer 130 may refine the raw alarm data. In this step 304, the alarm analyzer 130 may, for example, correlate the gathered alarm data, based on a predefined logic, to flag and subsequently treat the gathered alarm data that may be falling short of requirement inputs using, for example, regression. At step 306, the alarm analyzer 130 may classify the refined alarm data.

In an example, the alarm data may be classified based on whether the data impacts the service fulfillment span, interchangeably referred to as service fulfillment. The components associated with system may pick up a variety of raw data that may not impact service fulfillment or the health/performance of the underlying systems that support it. For instance, it may be possible that not all types of alarm data are applicable to a transaction type specific service fulfillment. Accordingly, in this step i.e., the step 306, the alarm analyzer 130 may beneficially segregate the various types of alarm data based on pre-defined impacts to specific transaction types so that an accurate performance prediction may be facilitated at the performance predictor 140. The pre-defined impacts may be based on based on historical data, which may include details regarding how an error impacted a transaction type in past. To generate historical data, in the past, when system impacts such as outages due to, for example, message queue issues, degraded performance due to infrastructure issues would have occurred, the alarm data during that period is captured. This snapshot of alarm data in conjunction with the undesirable event is captured, stored and processed using predefined methods to train the system.

Further, at step 308, the alarm analyzer 130 checks for outliers. It may be possible that not all alarms may have the same scope in terms of the transactions that are processed by the alarm analyzer 130. For example, an alarm pertaining to data at source (master data) may not be applicable as protocol for a check when the type of transaction received by the network order fulfillment system 110 is that of cancelling an appointment. Therefore, with implementation of step 308, the alarm analyzer 130 may be configured to further improve an accuracy of the performance prediction by the performance predictor 140 upon being provided the analyzed data by the alarm analyzer 130.

At step 310, the alarm analyzer 130 may group the alarm types into appropriate alarm batches. In this manner, live stream of transaction data (alarm streams) are grouped in corresponding alarm batches. At step 310, a real-time dataset of alarms at the moment of assessing service health may be aggregated on the basis of transaction types, and stored in a database (not shown) of the system 100, or alternatively, the network order fulfillment system 110 for subsequent use by the performance predictor 140 in making predictions to a future performance of the network order fulfillment system 110. As such, the alarm analyzer 130 may provide the analyzed data to the performance predictor 140 for predicting the performance of the network order fulfillment system 110. Details related to aspects and functionalities of the performance predictor 140 are explained in detail with reference to description of FIG. 4.

Figure 4:
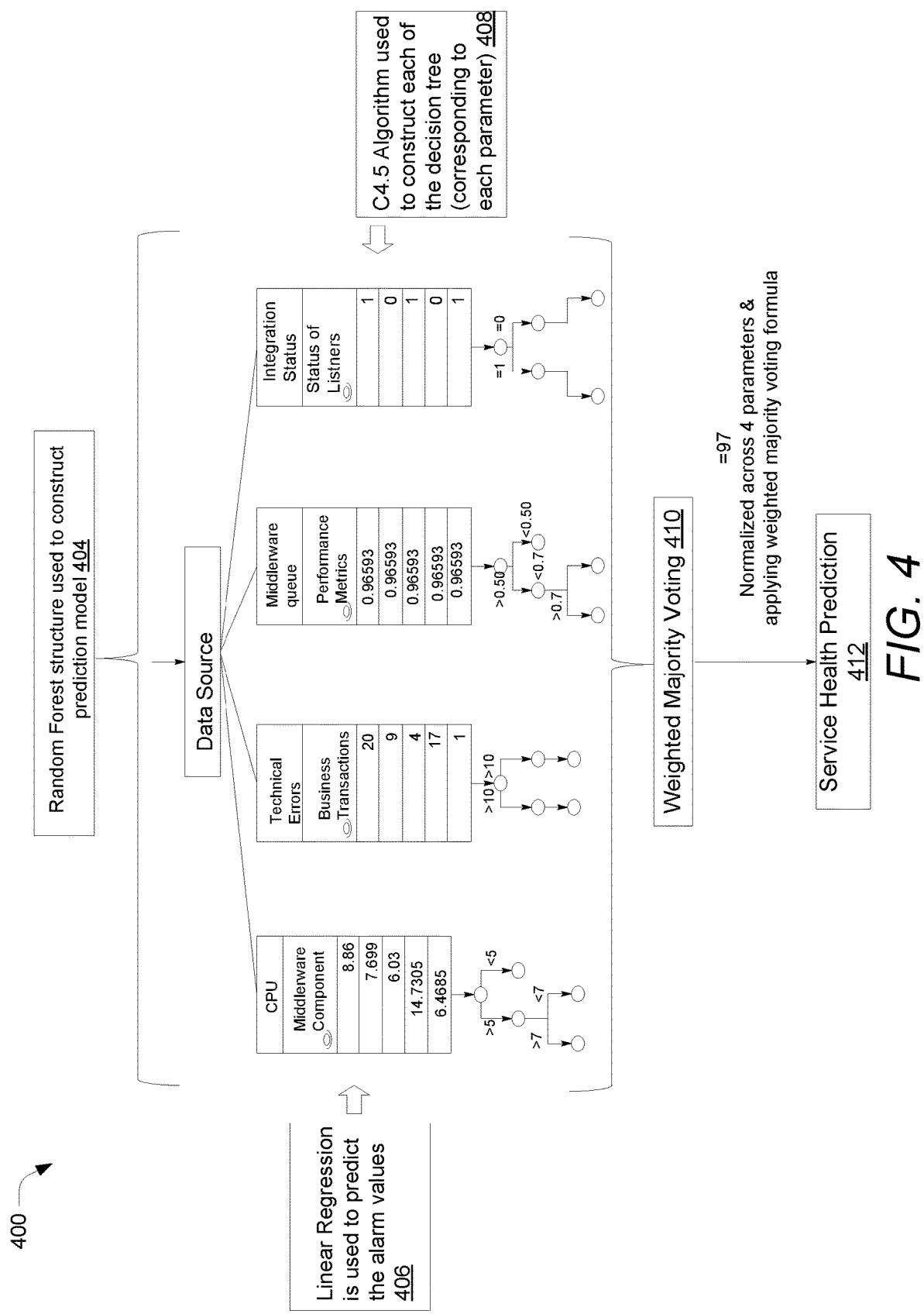
FIG. 4 illustrates an example implementation of the system of FIG. 1 for predicting the performance of the network order fulfillment system, according to an example embodiment of the present disclosure.

FIG. 4 illustrates an example implementation 400 of the performance predictor 140 for predicting the performance of the network order fulfillment system 110, according to an embodiment of the present disclosure. The embodiments for the performance predictor of the system herein are exemplary in nature and should be treated as such. For the sake of brevity and technical clarity, the description of the system may be restricted to a few exemplary embodiments, however, to a person of ordinary skill in the art, it should be clear that the performance predictor of the present system may be used for performing predictions of system performance by identifying various performance parameters other than that disclosed herein so that the network order fulfillment system can effectively perform a fulfillment of various types of orders other than those mentioned hereinafter.

As disclosed earlier herein, the performance predictor 140 may analyze a plurality of performance parameters corresponding to the transaction data and influencing a performance of the network order fulfillment system 110. TABLE 1 illustrates an example list of performance parameters that may be analyzed by the performance predictor 140. It will be appreciated the performance parameters listed herein are for the purpose of explanation only and not as a limitation.

TABLE 1

| Performance parameter/event | Description of analysis for identifying performance parameter | Impacted platform/ platform Component | Unit of measuring event | Frequency/ Time of event data capture |
|---|---|---|---|---|
| Integration Middleware Node Status | Check if the middleware node through which integrations are established is working | Middleware Application | Status of multiple integrated services | Every Minute |
| Integration Middleware Services Status | Check if the middleware services through which connections are established are up | Middleware Application | Status of multiple integrated services | Every Minute |
| Integration Processing Server connection status to Messaging Queues | Check if integration server is connected to the message queues to process incoming transactions | Messaging Queues | Status of multiple integrated services | Every Minute |
| Software Platform Virtual Machine status | Check if virtual machines are available | Application Services | Response Time Above Threshold | Every Minute |
| Database Status | Check if the databases are available | Database | Query Performance Above threshold | Every Minute |
| Database Query Performance Status | Check if the databases performance is above threshold | Database | Above threshold | Every Minute |
| Database Connectivity Status | Check if the databases are connected to the servers | Database | Query Performance Above threshold | Every Minute |
| Performance of Messaging Threads between various Technology Platform components | Check if the messaging threads through which transaction data passes between various fulfillment platform components are performing normally | Application Integrations & Connections | Response Time Above Threshold | Every Minute |
| CPU Utilization status | Check if CPU performance is above threshold or not | System Parameters | Above Threshold | Every Minute |
| Memory Utilization status | Check if CPU performance is above threshold or not | System Parameters | Above Threshold | Every Minute |
| Response time for integrations between various platforms or applications within the platform | Check if the interfaces between various fulfillment components are working optimally or not | Application Integrations & Connections | Above Threshold | Every Minute |
| Connection status between application & database | | Application Integrations & Connections | Query Performance above threshold | Every Minute |

TABLE 1-continued

| Performance parameter/event | Description of analysis for identifying performance parameter | Impacted platform/ platform Component | Unit of measuring event | Frequency/ Time of event data capture |
|---|---|---|---|---|
| Connection status between middleware & applications | Check if the middleware is connected to the application | Application Integrations & Connections | Query Performance Above threshold | Every Minute |
| Network availability | Check if the network is available or not | Application Integrations & Connections | Available or Unavailable | Every Minute |
| Mediation flow status & performance | Check if messages are passing through the mediation systems that are part of the fulfillment platform | Mediation Flows | Above Threshold | Every Minute |
| Data stemming from the incoming transaction | Capture the volume of incoming transactions | Inbound Transaction Data | Number of incoming transactions | Every Minute |
| Quality of data in the database i.e. systems of truth | Check if there is any errors stemming from incorrect, missing or corrupt data in the source databases | Master Data | Presence of Errors | Every Minute |
| Performance of the middleware queues | Check if the middleware queues are processing messages are working optimally or not | Application Services | Above Threshold | Every Minute |
| Middleware message transmission status | Check if middleware systems are transmitting messages to interfaced systems consistently | Messaging Queues | Wait Time Timeout Status | Every Minute |
| Mediation flow status & performance | Check if messages are passing through the mediation systems that are part of the network order fulfillment system | Mediation Flows | Above Threshold | Every Minute |

Referring to TABLE 1, a current status of one or more performance parameters may be received by the alarm analyzer 130 and be analyzed by the performance predictor 140 to identify the performance parameters that are exhibiting corresponding anomalies.

TABLE 2 below illustrates an example list of one or more anomalies that may be exhibited for the corresponding one or more performance parameters, and that which may be detected by the performance predictor 140.

TABLE 2

| Performance parameter/event | Anomaly detected |
|---|---|
| Integration Middleware Node Status | Integration Middleware Node Fail |
| Integration Middleware Services Status | Integration Middleware Services Fail |
| Integration Processing Server connection status to Messaging Queues | Integration Processing Server disconnects from Messaging Queues |
| Software Platform Virtual Machine status | Software Platform Virtual Machine fails or degrades |
| Database Status | Database is not available or performing sub optimally due to Database Deadlock |

TABLE 2-continued

| Performance parameter/event | Anomaly detected |
| --- | --- |
| Database Query Performance Status | Sub optimal Database Query Performance - due to Deadlock |
| Database Connectivity Status | Database Connectivity Fail |
| Performance of Messaging Threads between various Technology Platform components | Messaging Threads between various Technology Platform components Fail |
| CPU Utilization status | CPU Utilization threshold breached |
| Memory Utilization status | Memory Utilization threshold breached |
| Response time for integrations between various platforms or applications within the platform | Response time for integrations between various platforms or applications within the platform breaches threshold or timeout during processing |
| Connection status between application & database | Connection faults between application & database |
| Connection status between middleware & applications | Connection faults between middleware & applications |
| Network availability | Connection Faults and Network is operational |
| Mediation flow status & performance | Mediation flow faults |
| Data stemming from the incoming transaction | Data related issues stemming from the incoming transaction |
| Quality of data in the database i.e. systems of truth | Missing or corrupted master data in the database |
| Performance of the middleware queues | Sub-optimal performance of the middleware queues |
| Middleware message transmission status | Middleware not processing messages |

In detecting the anomalies for identifying the performance parameter that may be negatively impacting a performance of the network order fulfillment system 110, the performance predictor 140 may also consider, besides the current status of each performance parameter, the historical data pertaining to, or associated with, the performance of each platform or service fulfillment application of the network order fulfillment system 110 using a predefined prediction model. In an example embodiment, the performance predictor 140 may implement at least one of a decision tree generation technique, a Random Forest technique, and a C4.5 technique combined with a regression based prediction approach as shown in the view of FIG. 4.

Further, in an example embodiment, the performance predictor 140 may implement the Random Forest technique to construct the predefined prediction model as indicated at block 404. Further, the linear regression may be used to predict alarm values each of the plurality of the performance parameters as indicated at block 406. Furthermore, the C4.5 technique may be implemented generate a decision tree for each of the plurality of the performance parameters as indicated by block 408. For the sake of brevity, the analysis pertaining four performance parameters has been illustrated, it will be appreciated that the same may be done for remaining parameters. The performance predictor 140 may determine a performance score for service applications across the entire scope of the network order fulfillment system 110, based on a weighted majority voting of the plurality of parameters as indicated by block 410. The score may be generated by normalizing across four parameters and applying weighted majority voting formula as discussed in equation (1). The weighted majority voting disclosed herein may be based on outputs on the decision tree for each of the plurality of the performance parameters. Equation 1 below may be used as an example weighted majority voting technique for calculating the predicted service fulfillment health or predicted service health score.

$$\sum_{x=1}^{N} Kx * \frac{Gx}{\sum_{i=0}^{N} Gy}; \qquad \text{equation 1}$$

wherein
N=count of performance parameters, for example, 16 parameters;
G=importance of the performance parameter concerned; and
K=severity of the performance parameter, for example,
 for normal severity K=100,
 for low severity K=70,
 for medium severity K=50,
 for high severity K=30, and
 for critical severity K=0.

In an example, the regression tree technique may be used to define the weight of the parameters as the technique is fed with training data and test data. This data may include a past span of system alarm data or parameter data in correlation with the performance, for example, undesirable events. While deploying, pre-defined weights may be input to these parameters based on expert judgement and then allow the machine learning system driven by the regression tree to re-adjust it.

For instance, if the machine learning system is allowed to operate independently without expert interference, it may limit the number of parameters to 3-4 to start with since the other parameters may have not caused any impact (positive or negative) during the span of alarm/parameter data and events included in training the systems. However, this may take longer to deploy the system effectively. In other examples, the regression tree model may be allowed to set the importance/weight factor.

In the example depicted in FIG. 4, upon applying the weighted majority voting technique as per equation 1 on four of the performance parameters namely—middleware component, middleware queue, Integration Status, and data stemming from incoming transactions, a predicted service health score of 97 is obtained. The output of the performance predictor 140 may be presented as a service fulfillment health as indicated by block 412. It may be noted that this singular value is representative of an instantaneous performance level of the network order fulfillment system 110 while taking into account only four out of the nineteen performance parameters into consideration.

However, in a practical implementation of the system 100, the system 100 may beneficially predict the service health score or performance level of the network order fulfillment system 110 dynamically and in real-time. Further, such a service health score, predicted dynamically and in real-time, may even be presented, for example, graphically, to service personnel associated with the network order fulfillment system 110. An example of a graphical representation of actual service health and predicted service health of the network order fulfillment system 110 is depicted across a time horizon, for example, over a period of nine hours and thirty minutes of a calendar day in the view of FIG. 5.

Figure 5:
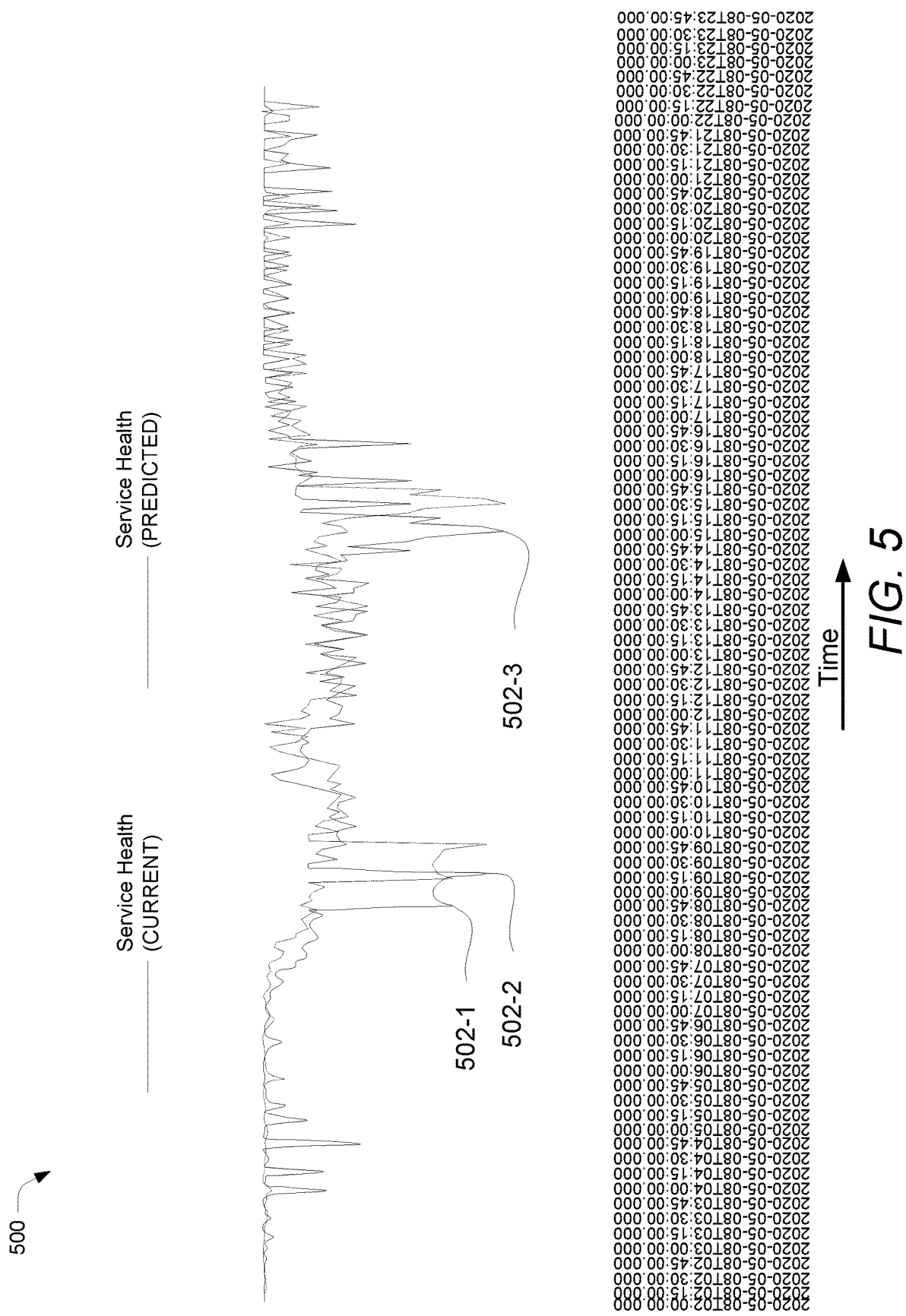
FIG. 5 illustrates functional aspects of a performance of the system of FIG. 1, according to an example embodiment of the present disclosure.

FIG. 5 illustrates a plot 500, where the predicted service health is depicted by a solid line while the actual/current/ as measured service health is illustrated by a dashed line, according to an example embodiment of the present disclosure. The service health may be understood as performance of the network order fulfillment system 110. As can be observed, the system 100 predicts a drop in the performance levels of the network order fulfillment system 110 first—at 0900 hours indicated by 502-1, second—at 0945 hours, indicated by 502-2 and third—at 1530 hours, indicated by 502-3, while the actual or current performance level of the network order fulfillment system 110 at 0930 hours, 1015 hours, and 1600 hours corresponds to, or corroborates with, the performance levels predicted by the system 100 i.e., the performance predictor 140 of the system 100 at 0900 hours, 0945 hours, and 1530 hours respectively. Thus, with implementation of the system 100 disclosed herein, potential errors that may occur are detected beforehand i.e., before such errors negatively impact the performance of the network order fulfillment system 110, for example, 30 minutes before potential degradation of system performance.

Upon predicting the service health i.e., a future performance of the network order fulfillment system 110, the performance predictor 140 may determine that the performance is being negatively impacted when the performance score is less than a threshold score, and identify the performance parameter from the plurality of performance parameters exhibiting an anomaly, based on a corresponding alarm value. In continuation with the example above, if the performance threshold is 95, then the predicted service health score of 97 is deemed acceptable and operation of the network order fulfillment system 110 is continued. However, if the performance threshold is 98, then the predicted service health score of 97 is deemed unacceptable, and a correction may be required to the anomalies or potential errors by, for example, the auto remediator 150 of the system 100. Details to aspects and functionalities of the auto remediator 150 are explained in detail with reference to description of FIGS. 6 and 7A through 7D.

Figure 6:
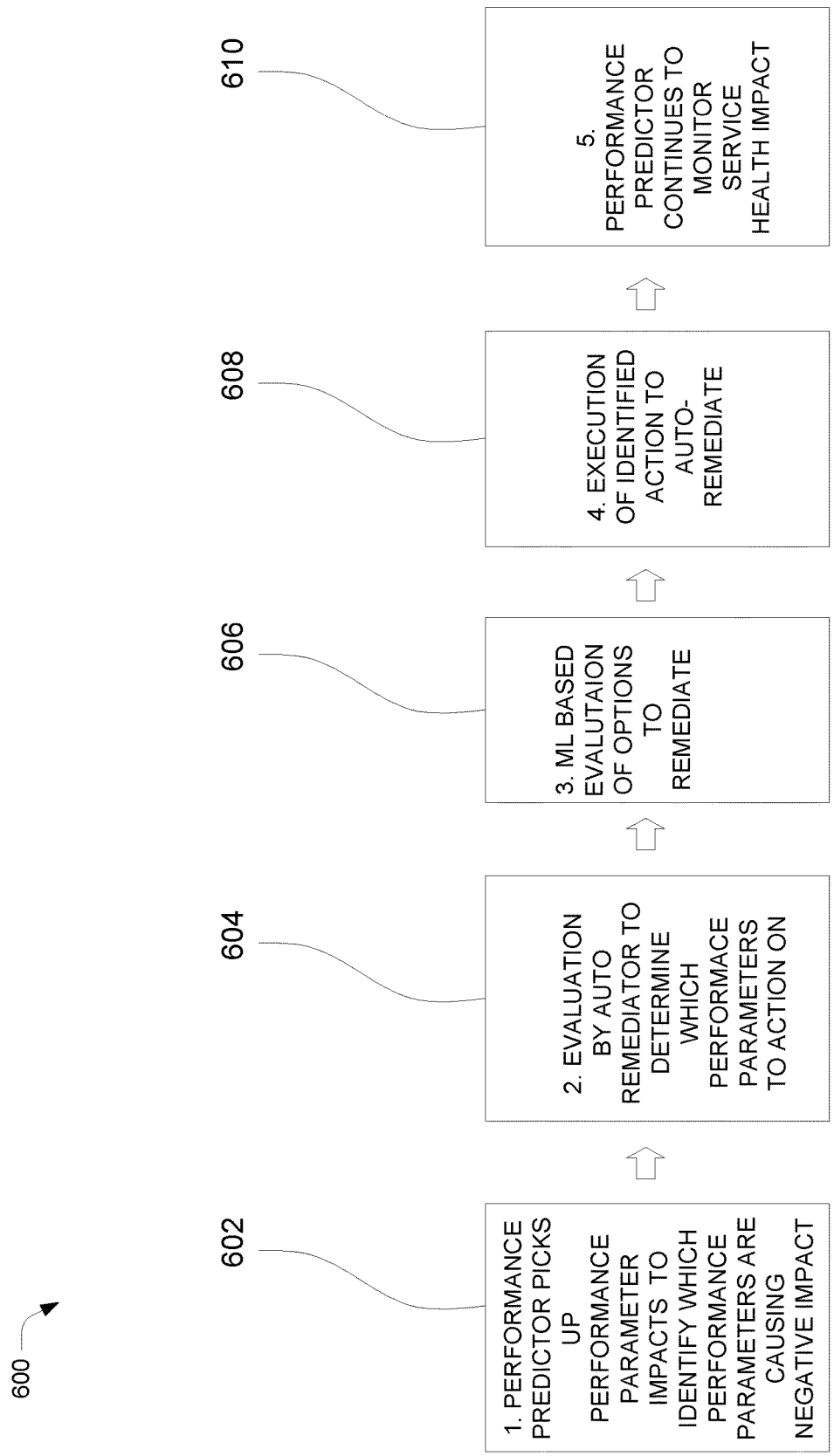
FIG. 6 illustrates the functioning of a performance predictor and an auto remediator of the system, according to an example embodiment of the present disclosure.
Figure 7B:
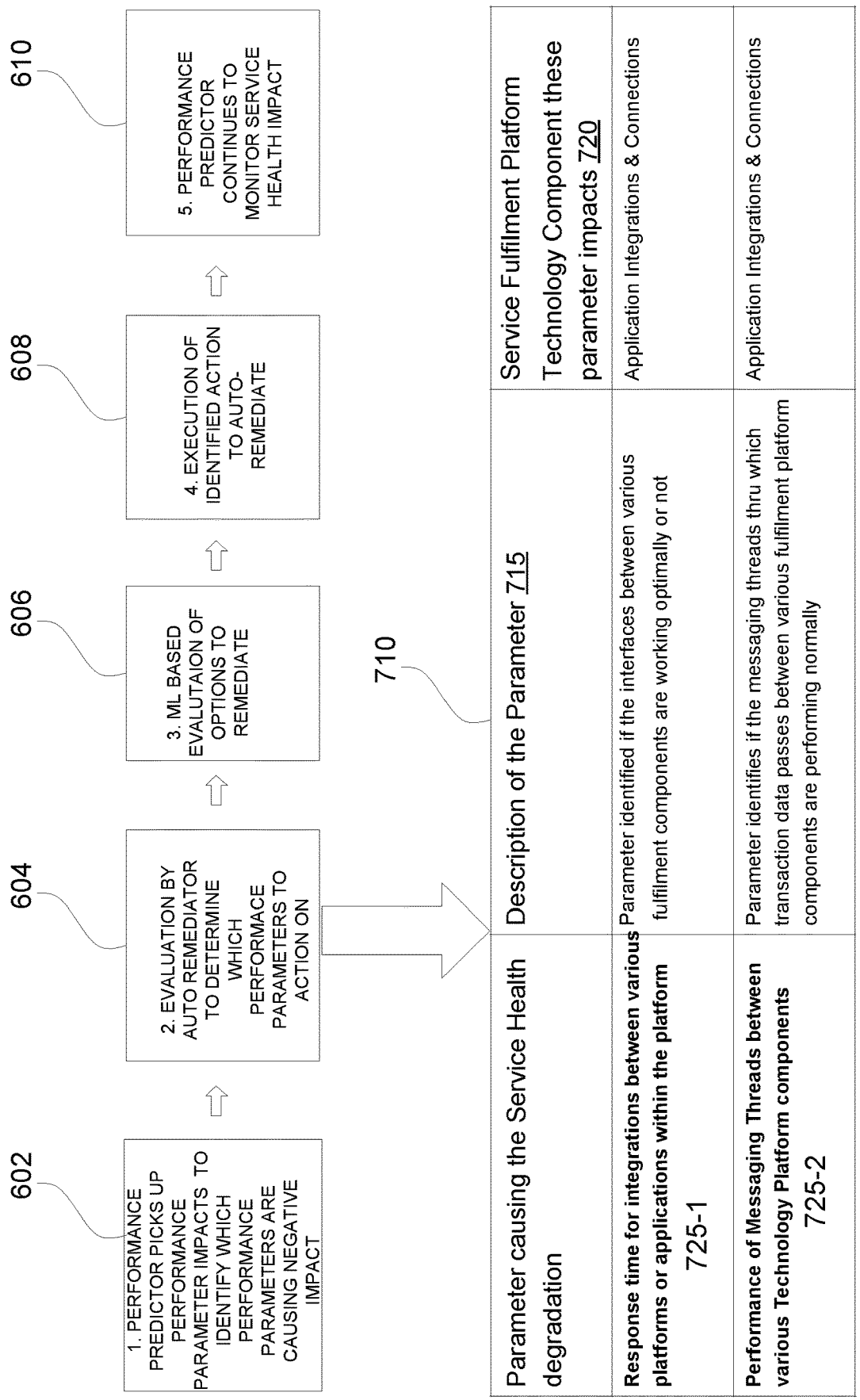

FIG. 6 illustrates a process 600 carried out by the performance predictor 140 and the auto remediator 150 of the system 100 of FIG. 1, according to an example embodiment of the present disclosure. FIGS. 7A-7D illustrate aspects and functioning of the system 100, and in particular, aspects and functioning of the auto remediator 150 of the system 100 of FIG. 1, according to an example embodiment of the present disclosure. As shown in FIG. 6, at step 602 and as disclosed earlier herein, the performance predictor 140 may identify the parameters that may cause a negative impact to the performance of the network order fulfillment system 110. Thus, during prediction phase while reporting service health at real time, the process also picks up the parameters (either one or multiple) that are causing a negative impact. In an example, FIG. 7A depicts a graphical representation 705 of the performance parameters and their impact on the performance of the network order fulfillment system 110. The metrics corresponding to the performance parameters being plotted over a time horizon based upon prediction by the performance predictor 140 that the system performance may be downgraded, or be deteriorated, by these specific performance parameters in a near, or foreseeable, future period of time. Thus, the graphical representation 705 shows the trend of metrics which impacts the overall service health score for applications of the network network order fulfillment system 110. These metrics help in creating a timeseries which can be used for health score predictions.

At step 604, these performance parameters are evaluated by the auto remediator 150 for determining, for example, a number and type of performance parameters to remediate. Further, in step 604, the auto remediator 150 may identify from the list of performance parameters, the sub-set of performance parameters that specifically require a course of remedial action. The auto remediator 150 may validate and correlate impacting service health. It may be straightforward, when there is a single parameter breaching thresholds but if there are more than one, the auto remediator 150 may implement a rule based approach to identify which parameters to action on. The rule based approach, in an example, may be governed by machine learning.

As such, in an example embodiment, the auto remediator 150 may further ascertain whether there are multiple performance parameters exhibiting anomalies, and correlate the multiple performance parameters to identify one or more performance parameters to take action on, based on the evaluation rules, when the multiple performance parameters exhibit the anomalies. FIG. 7B depicts, by way of an example, a table 710 illustrating details pertaining to correlated two performance parameters that may negatively impact future system performance. The details may include a description of the parameter 715 and service fulfillment technology component the parameter impacts 720. These two performance parameters may include, for example, a response time for integrations between various platforms or response time between applications within the platform 725-1, and a performance of messaging threads between various platform components 725-2.

In various embodiments of the present disclosure, it will be appreciated that if there is only one performance parameter that exhibits an anomaly and may therefore, negatively affect the system performance of the network order fulfillment system 110, the auto remediator 150 may simply select an appropriate remediation action to remediate the potential error caused by the identified performance parameter. However, to the contrary, when more than one performance parameter exhibits anomalies and each of those performance parameters may, in an individual capacity, negatively affect the system performance of the network order fulfillment system 110, then the auto remediator 150 may be configured to implement a rule based approach in selecting specific ones of the performance parameters to perform the remediation actions on. It is hereby contemplated that remediation actions may be carried out to remediate potential errors caused by all of the identified performance parameters that are likely to negatively impact system performance, however, some of the potential errors may take, for example, precedence, or a higher priority, over others and may be remediated upon first before a remainder of the potential errors caused by a set of lower priority performance parameters.

Figure 7C:
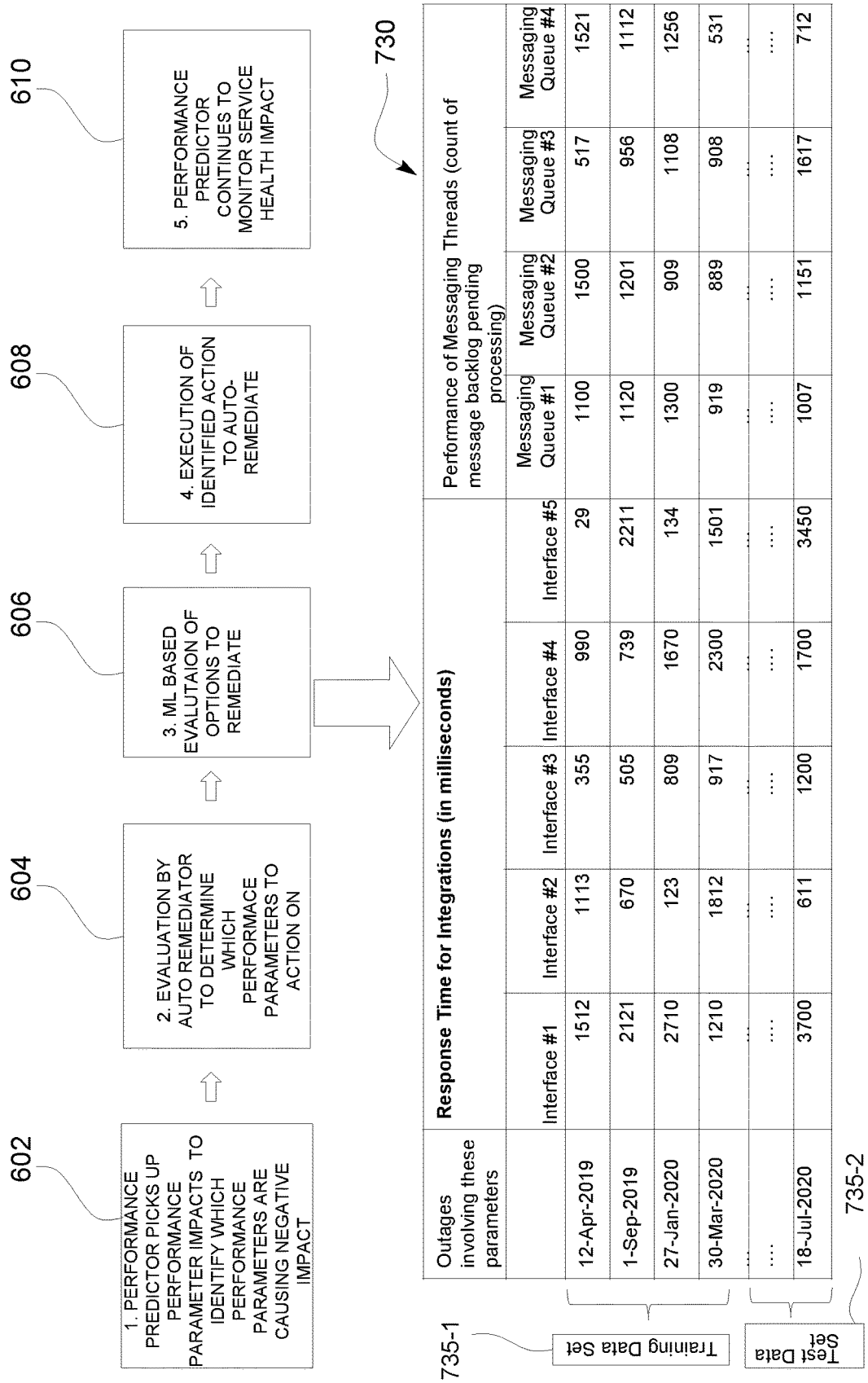
Figure 7D:
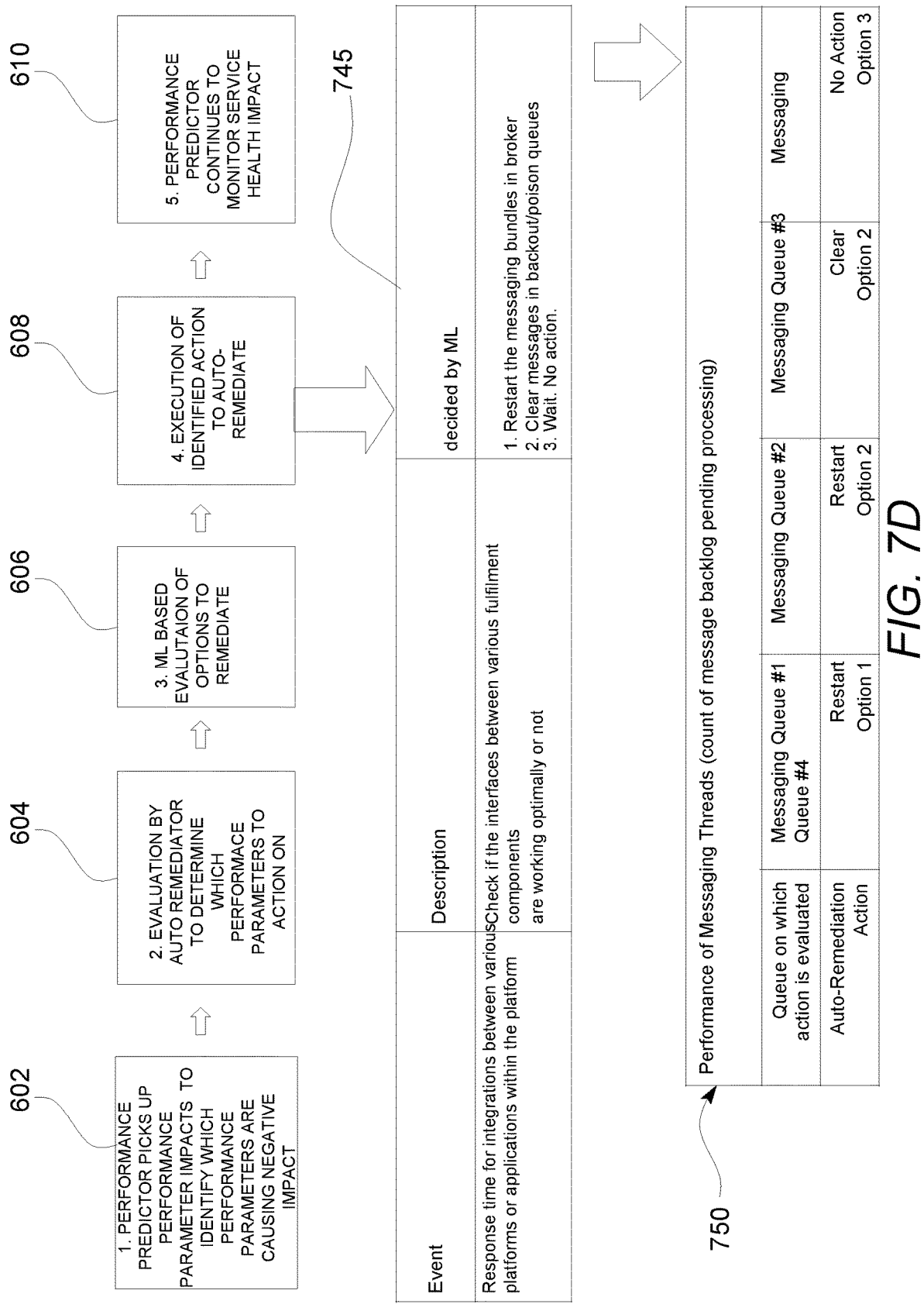

Referring again to FIG. 6, at step 606, the auto remediator 150 may also perform a machine learning (ML) based evaluation of the remediation actions to execute in order to remedy the anomalies caused by the performance parameters that have been identified and ascertained for potentially causing a negative impact on system performance of the network order fulfillment system 110. FIG. 7C illustrates, by way of an example, a tabulation 730 of data depicting a manner in which the auto remediator 150 may implement the machine learning (ML) based evaluation of the remediation actions. In this example, the auto remediator 150 may implement, for example, a training dataset 735-1 and a test data set 735-2. In an example, validation data (not shown in figures) may also be implemented to check the results of learning process.

Further, the training dataset 735-1 may be derived from historical data obtained during optimal system performance. The training dataset 735-1 may be used, for example, to define, or regulate, a boundary condition for desired system performance via implementation of linear regression on the test dataset 735-2 acquired from, for example, a current system performance of the network order fulfillment system 110. It will be appreciated that a semi-supervised learning model may beneficially be adopted by the auto remediator 150 using a substantially, or relatively, small or leaner dataset as the training dataset in comparison to a relatively large test dataset to avoid overloading a computational capacity of the system 100 disclosed herein. Moreover, in forming the ML based evaluation model, the training data and the test data may be extracted multiple times randomly so that various permutations and combinations of training data set 735-1 and test dataset 735-2 are made available in various iterations to continually train the ML based evaluation model used by the auto remediator 150.

Referring to example in the step 604, based on the metric depicted by the table 730, the machine learning model may prescribe auto remediating the response time for integrations between various platforms or response time between applications within the platform 725-1 to improve degraded service health. The network order fulfillment system 110 may include event data pertaining to events or incidents that degrade performance of the performance of the network order fulfillment system 110 and cause one of more transaction types to fail. For example, the event data may include options to auto-remediate that will be identified and executed in real time based on the machine learning model. In an example, the event may be integration middleware node status and corresponding description in the data may indicate to check if the middleware node, through which integrations are established, is working. Further, the options for auto remediation actions for the event defined by the machine learning may be to wait for auto recovery and trigger a script to automatically restart the node.

Referring again to FIG. 6, at step 608, the auto remediator 150 may also execute identified remediation actions based on the ML based evaluation performed in step 606. As shown by way of an example in FIG. 7D, the table 745 depicts the options available determined based on the machine learning model as illustrated in table 740. The table 745 illustrates that when the response time for integrations between various platforms or applications within the platform has been unsatisfactory (ascertained upon comparison with predefined thresholds and as determined by the performance predictor 140), then the auto remediator 150 may execute one or more identified remediation actions. Some of the identified remediation options may include, but is not limited to, restarting a messaging bundle in a broker, clearing of messages in a backout/poison queue, or simply wait and perform no action as illustrated at table 745, which corresponds to an entry pertaining to parameter 725-1, which may be stored in the event data.

The table 750, illustrates options for the second parameter 725-2, which is performance of messaging threads, based on options in the events data. The performance of messaging threads i.e., a count of message backlog pending processing, a first messaging queue i.e., messaging queue #1, a restarting of the messaging bundles in the broker may be adopted while in other messaging queues, for example, a second messaging queue and a third messaging queue i.e., the messaging queues #2 and #3, the messages may be cleared out, while for yet another messaging queue, for example, messaging queue #4, no action may be performed. In this manner, the auto remediator 150 may improve a speed of auto remediation and consequently achieve a decrease in the response time for integrations between various platforms (or applications within the platform) to satisfactory levels (as ascertained and determined by the performance predictor 140 upon comparison with predefined thresholds).

Referring again to FIG. 6, at step 610, the process 600 loops back i.e., becomes recursive in which the performance predictor 140 continues to predict service health i.e., performance of the network order fulfillment system 110 while results obtained from remediation actions performed by the auto remediator 150 may be captured by the performance predictor 140 for performing the subsequent predictions pertaining to the performance of the network order fulfillment system 110.

Figure 8:
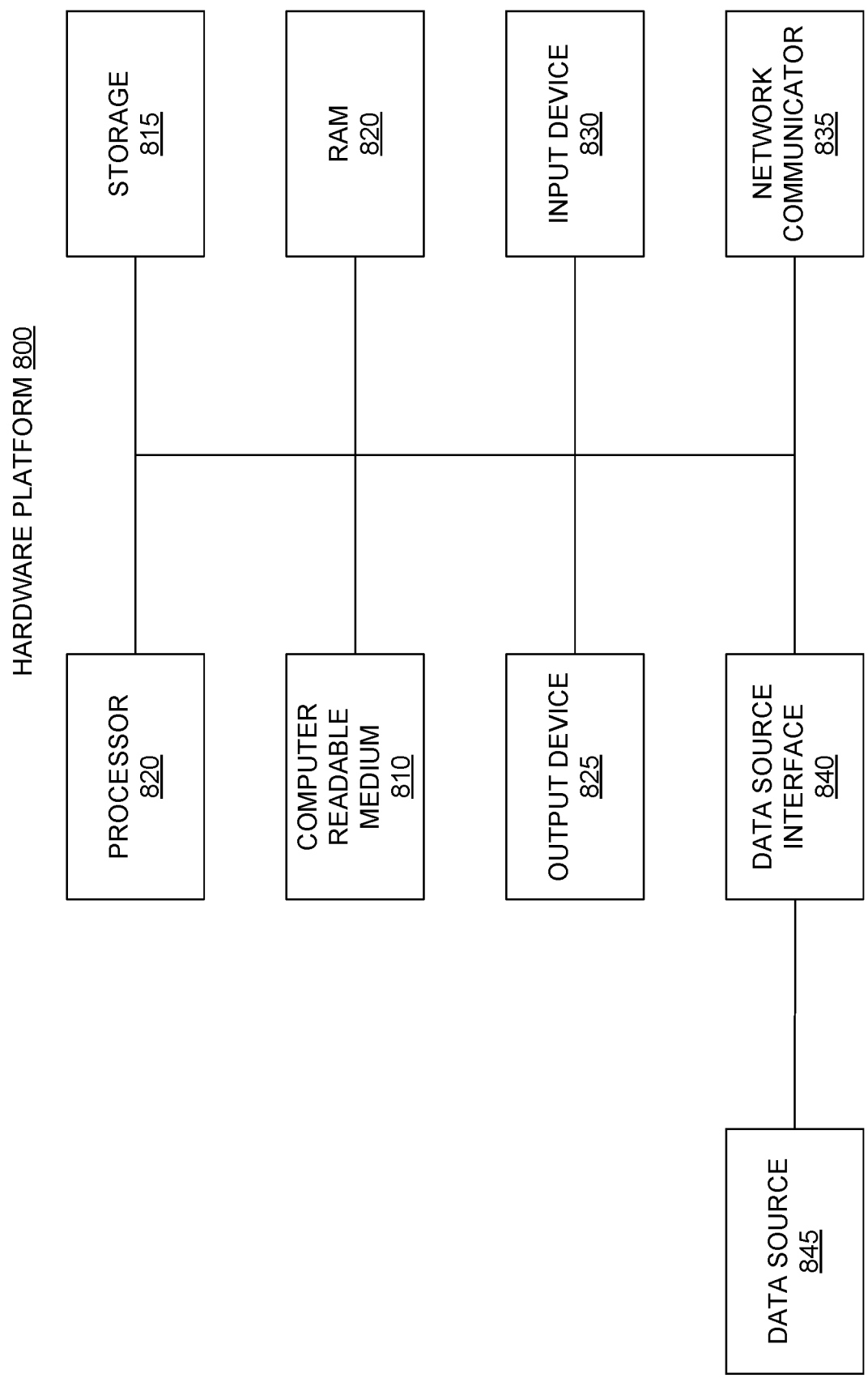
FIG. 8 illustrates a hardware implementation of the system, in accordance with an implementation of the present disclosure.

Referring to FIG. 8, the hardware platform 800 may be a computer system 800 that may be used with the examples described herein. The computer system 800 may represent a computational platform that includes components that may be in a server or another computer system. The computer system 800 may execute, by way of a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 800 may include a processor 805 that executes software instructions or code stored on a non-transitory computer-readable storage medium 810 to perform methods of the present disclosure. The software code includes, for example, instructions to monitor and classify the customer driven transaction data into the plurality of alarm types, analyze and identify the plurality of performance parameters for anomalies, ascertain whether the identified one or more performance parameters negatively impact a performance of the network order fulfillment system 110, and implement the remediation action. In an example, the alarm analyzer 130, the performance predictor 140, and the auto remediator 150 may use the software codes.

The instructions on the computer-readable storage medium 810 are read and stored the instructions in storage 815 or in random access memory (RAM) 820. The storage 815 provides a large space for keeping static data where at least some instructions could be stored for later execution. The stored instructions may be further compiled to generate other representations of the instructions and dynamically stored in the RAM 820. The processor 805 reads instructions from the RAM 820 and performs actions as instructed.

The computer system 800 further includes an output device 825 to provide at least some of the results of the execution as output including, but not limited to, visual information to service technicians, such as network management personnel. The output device 825 can include a display on computing devices and virtual reality glasses. For example, the display can be a mobile phone screen or a laptop screen. GUIs and/or text are presented as an output on the display screen. The computer system 800 further includes an input device 830 to provide a user or another device with mechanisms for providing data and/or otherwise interact with the computer system 800. The input device 830 may include, for example, a keyboard, a keypad, a mouse, or a touchscreen. Each of these output devices 825 and input devices 830 could be joined by one or more additional peripherals. In an example, the output device 825 may be used to display predicted health of a service application or platform as depicted in the view of FIG. 5.

A network communicator 835 may be provided to connect the computer system 800 to a network, for example, a network to which the network order fulfillment system 110 pertains, and also to other devices connected to the network including clients, servers, data stores, and interfaces, for instance. A network communicator 835 may include, for example, a network adapter such as a LAN adapter or a wireless adapter. The computer system 800 includes a data source interface 840 to access data source 845. A data source is an information resource. As an example, a database of exceptions and rules may be a data source. Moreover, knowledge repositories and curated data may be other examples of data sources.

Figure 9:
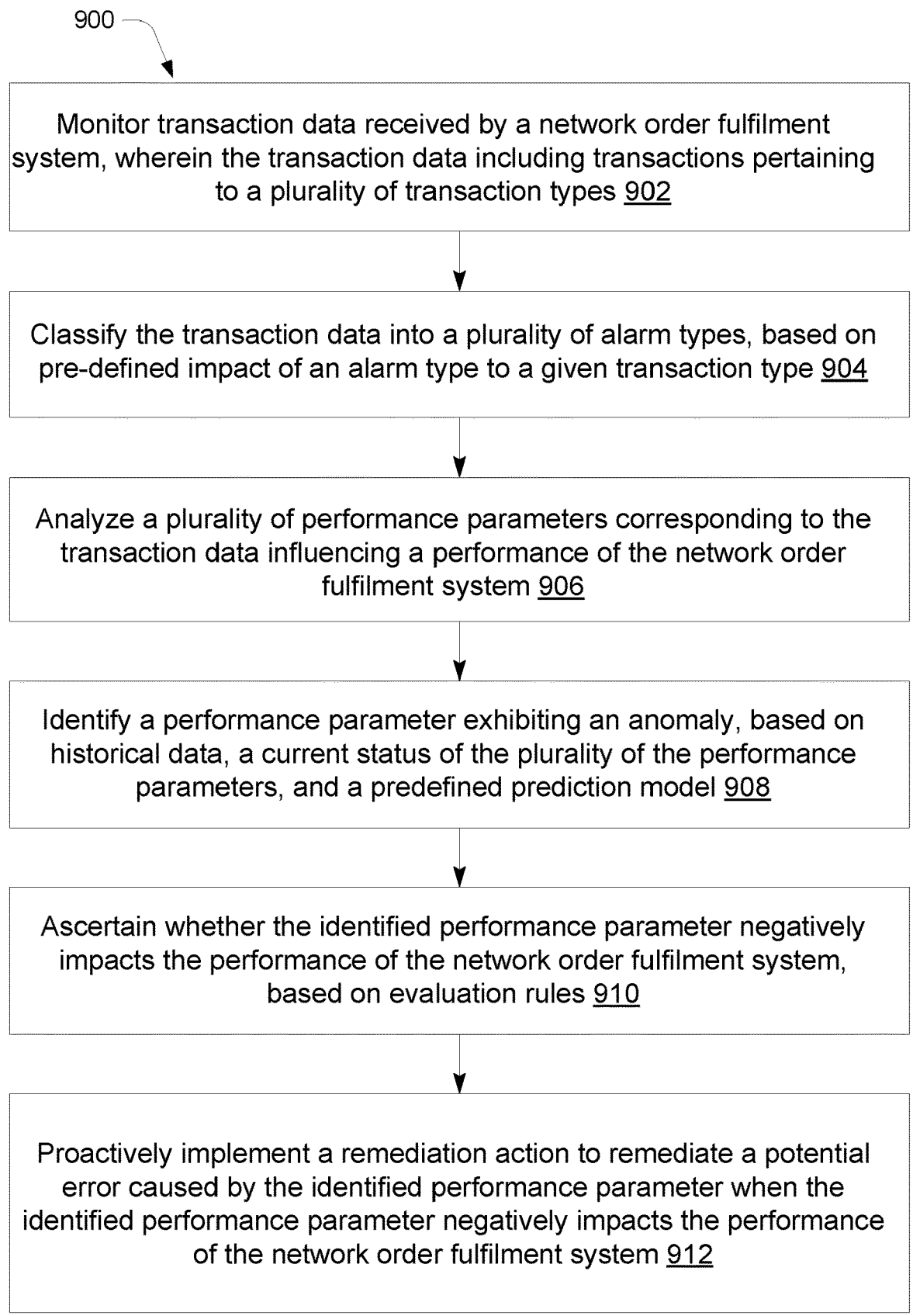
FIG. 9 illustrates a process flowchart for predicting performance of a network order fulfillment system, according to an example embodiment of the present disclosure.

FIG. 9 illustrates a process flowchart for predicting performance of a network order fulfillment system 110, according to an example embodiment of the present disclosure.

It should be understood that method steps are shown here for reference only and other combinations of the steps may be possible. Further, the method 900 may contain some steps in addition to the steps shown in FIG. 9. For the sake of brevity, construction and operational features of the system 100 which are explained in detail in the description of FIGS. 1-8 are not explained in detail in the description of FIG. 9. The method 900 may be performed by a component of the system 100, such as the processor 120, the alarm analyzer 130, the performance predictor 140, and the auto remediator 150.

At block 902, transaction data including transactions pertaining to a plurality of transaction types received by a network order fulfillment system 110 having a multi-platform configuration for fulfilling network orders, may be monitored. In an example, the alarm analyzer 130 may monitor the transaction data received by the network order fulfillment system 110.

At block 904, the transaction data may be classified into a plurality of alarm types, based on pre-defined impact of an alarm type to a given transaction type. In an example, a volume of incoming transactions and a live status of events, i.e., transaction data are monitored. Thus, based on monitoring, a real-time status of the transaction data may be determined to classify the transaction data into a plurality of alarm types, the classification being based on a pre-defined impact of an alarm type to a given transaction type. These two inputs are then processed into the performance predictor. In an example, the alarm analyzer 130 may classify the customer driven transaction data into a plurality of alarm types, based on pre-defined impact of the alarm type to the given transaction type.

At block 906, a plurality of performance parameters corresponding to the transaction data influencing a performance of the network order fulfillment system 110, may be analyzed. In an example, the performance predictor 140 may analyze the plurality of performance parameters that influence a performance of the network order fulfillment system 110.

At block 908, a performance parameter exhibiting an anomaly, based on historical data, a current status of the plurality of the performance parameters, and a predefined prediction model may be identified. In an example, the performance predictor 140 may identify the performance parameter that is exhibiting an anomaly.

At block 910, the identified performance parameter may be ascertained, based on evaluation rules, whether the identified performance parameter negatively impacts the performance of the network order fulfillment system 110. In an example, the auto remediator 150 may ascertain whether the identified performance parameter negatively impacts the performance of the network order fulfillment system 110.

At block 912, when the identified performance parameter negatively impacts the performance of the network order fulfillment system 110, a remediation action for remediating a potential error caused by the identified performance parameter may be proactively implemented. In an example, the auto remediator 150 may proactively implement the remediation action.

The method 900 may further include analyzing the transaction data to determine a volume of incoming transactions and a real-time status of each of the plurality of the performance parameters associated with the transaction data that is being monitored. In an example, the alarm analyzer 130 may analyze the transaction data. In an example, since the incoming transactions produces a variety of reactions on the system parameters that have an impact of the overall service health, these impact are analyzed by the alarm analyzer 130. Additionally, the method 900 may further include providing the analyzed data for predicting the performance of the network order fulfillment system 110. In an example, the alarm analyzer 130 may provide the analyzed data to the performance predictor 140 for predicting the performance of the network order fulfillment system 110.

Further, the method 900 may also include identifying the performance parameter that exhibits the anomaly by implementing at least one of a decision tree generation technique, a Random Forest technique, and a C4.5 technique combined with a regression based prediction approach. In an example, the performance predictor 140 may implement at least one of the decision tree generation technique, the Random Forest technique, and the C4.5 technique combined with the regression based prediction approach to identify the performance parameter exhibiting the anomaly.

Furthermore, the method 900 may also include implementing the Random Forest technique to construct the predefined prediction model implementing a linear regression technique to predict an alarm value for each of the plurality of the performance parameters, implementing the C4.5 technique to generate a decision tree for each of the plurality of the performance parameters, and determining a performance score for across the entire scope of the network order fulfillment system 110 based on a weighted majority voting of the plurality of parameters in which the weighted majority voting is based on outputs on the decision tree for each of the plurality of the performance parameters. In an example, the performance predictor 140 may construct the predefined prediction model to predict the alarm value, generate a decision tree for each of the plurality of the performance parameters, and determine the performance score for a service application of the network order fulfillment system 110.

Moreover, the method 900 may also include determining that the performance is being negatively impacted when the performance score is less than a threshold score, and identifying the performance parameter from the plurality of performance parameters, exhibiting the anomaly, based on a corresponding alarm value. In an example, the performance predictor 140 may determine that the performance is being negatively impacted when the performance score is less than a threshold score, and identify the performance parameter exhibiting the anomaly based on a corresponding alarm value.

Additionally, the method 900 may further include ascertaining whether there are multiple performance parameters exhibiting anomalies. In an example, the performance predictor 140 may ascertain whether there are multiple performance parameters exhibiting anomalies. Further, the method 900 may also include correlating the multiple performance parameters to identify one or more performance parameters to take action on, based on the evaluation rules, when the multiple performance parameters exhibit the anomalies. In an example, the auto remediator 150 may correlate the multiple performance parameters to identify one or more performance parameters to take action on when the multiple performance parameters exhibit the anomalies.

In accordance with various embodiments of the present disclosure, the plurality of performance parameters include an integration middleware node status, an integration middleware service status, a connection status of integration processing server with messaging queues, a software platform virtual machine status, a database status, a database query performance status, a database connectivity status, a performance of messaging threads between various technology platform components, a CPU utilization status, a memory utilization status, a response time for integrations between various platforms or applications within the platform, a connection status between an application and a database, a connection status between a middleware and applications, connection faults between network and a database, a mediation flow status and performance, data related issues stemming from the transaction data, a quality of data in the database, a performance of the middleware queues, and a middleware message transmission status.

Further, the method 900 may also include implementing a machine learning based evaluation model to evaluate a plurality of remediation action options available to remedy the potential error. In an example, the auto remediator 150 may implement the machine learning based evaluation model for evaluating the plurality of remediation action options available to remedy the potential error.

In an example, the method 900 may be a computer-implemented method. In an example, the method 900 may be practiced using a non-transitory computer-readable medium including machine readable instructions that are executable by a processor to perform the method 900 or to implement the functionality of the system 100.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:
1. A system comprising:
a processor;
an alarm analyzer coupled to the processor, the alarm analyzer to:
monitor transaction data received by a network order fulfillment system having a multi-platform configuration for fulfilling network tasks, the transaction data including transactions pertaining to a plurality of transaction types; and
based on monitoring, determine a real-time status of the transaction data to classify the transaction data into a plurality of alarm types, the classification being based on a pre-defined impact of an alarm type to a given transaction type;
a performance predictor coupled to the processor, the predictor to:
analyze a plurality of performance parameters corresponding to the transaction data influencing a performance of the network order fulfillment system;
determine a performance score for service applications of the network order fulfillment system, based on a weighted majority voting of the plurality of performance parameters, wherein the weighted majority voting is based on a decision tree for each of the plurality of the performance parameters;
identify a performance parameter exhibiting an anomaly, based on historical data, a current status of the plurality of the performance parameters, and a predefined prediction model when the performance score is less than a threshold score;
determine that the performance is being negatively impacted when the performance score is less than the threshold score; and
identify the performance parameter from the plurality of performance parameters exhibiting an anomaly, based on a corresponding alarm value; and
an auto remediator coupled to the processor, the auto remediator to:
ascertain whether the identified performance parameter negatively impacts the performance of the network order fulfillment system, based on evaluation rules;
proactively implement a remediation action to remediate a potential fault caused by the identified performance parameter when the identified performance parameter negatively impacts the performance of the network order fulfillment system.

2. The system as claimed in claim 1, wherein the alarm analyzer is to:
analyze the transaction data to determine a volume of incoming transactions and a real-time status of each of the plurality of the performance parameters associated with the transaction data that is being monitored; and
provide the analyzed data to the performance predictor for predicting the performance of the network order fulfillment system.

3. The system as claimed in claim 1, wherein the performance predictor is to implement at least one of a Random Forest technique, and a C4.5 technique combined with a regression based prediction approach.

4. The system as claimed in claim 3, wherein the performance predictor is to:
   implement the Random Forest technique to construct the predefined prediction model;
   implement a linear regression technique to predict an alarm value for each of the plurality of the performance parameters; and
   implement the C4.5 technique to generate a decision tree for each of the plurality of the performance parameters.

5. The system as claimed in claim 1, wherein the auto remediator is to:
   ascertain whether there are multiple performance parameters exhibiting anomalies;
   correlate the multiple performance parameters to identify one or more performance parameters to take action on, based on the evaluation rules, when the multiple performance parameters exhibit the anomalies.

6. The system as claimed in claim 1, wherein the plurality of performance parameters include an integration middleware node status, an integration middleware service status, a connection status of integration processing server with messaging queues, a software platform virtual machine status, a database status, a database query performance status, a database connectivity status, a performance of messaging threads between various technology platform components, a CPU utilization status, a memory utilization status, a response time for integrations between various platforms or applications within the platform, a connection status between an application and a database, a connection status between a middleware and applications, connection faults between network and a database, a mediation flow status and performance, data related issues stemming from the transaction data, a quality of data in the database, a performance of the middleware queues, and a middleware message transmission status.

7. The system as claimed in claim 1, wherein the auto remediator is to implement a machine learning based evaluation model to evaluate a plurality of remediation action options available to remedy the potential fault.

8. A method comprising:
   monitoring, by a processor, transaction data received by a network order fulfillment system having a multi-platform configuration for fulfilling network tasks, the transaction data including transactions pertaining to a plurality of transaction types;
   based on monitoring, determining a real-time status of the transaction data to classify the transaction data into a plurality of alarm types, the classification being based on a pre-defined impact of an alarm type to a given transaction type;
   analyzing, by the processor, a plurality of performance parameters corresponding to the transaction data influencing a performance of the network order fulfillment system;
   determining, by the processor, a performance score for service applications of the network order fulfillment system, based on a weighted majority voting of the plurality of performance parameters, wherein the weighted majority voting is based on a decision tree for each of the plurality of the performance parameters;
   identifying, by the processor, a performance parameter exhibiting an anomaly, based on historical data, a current status of the plurality of the performance parameters, and a predefined prediction model when performance score is less than the threshold score;
   determining, by the processor, that the performance is being negatively impacted when the performance score is less than the threshold score;
   identifying, by the processor, the performance parameter from the plurality of performance parameters exhibiting the anomaly, based on a corresponding alarm value;
   ascertaining, by the processor, whether the identified performance parameter negatively impacts the performance of the network order fulfillment system, based on evaluation rules; and
   implementing proactively, by the processor, a remediation action to remediate a potential error caused by the identified performance parameter when the identified performance parameter negatively impacts the performance of the network order fulfillment system.

9. The method as claimed in claim 8, further comprising:
   analyzing, by the processor, the transaction data to determine a volume of incoming transactions and a real-time status of each of the plurality of the performance parameters associated with the transaction data that is being monitored; and
   providing, by the processor, the analyzed data for predicting the performance of the network order fulfillment system.

10. The method as claimed in claim 8, wherein identifying the performance parameter exhibiting the anomaly includes implementing, by the processor, at least one of a Random Forest technique, and a C4.5 technique combined with a regression based prediction approach.

11. The method as claimed in claim 10, further comprising:
   implementing, by the processor, the Random Forest technique to construct the predefined prediction model;
   implementing, by the processor, a linear regression technique to predict an alarm value for each of the plurality of the performance parameters; and
   implementing, by the processor, the C4.5 technique to generate a decision tree for each of the plurality of the performance parameters.

12. The method as claimed in claim 8, further comprising:
   ascertaining, by the processor, whether there are multiple performance parameters exhibiting anomalies;
   correlating, by the processor, the multiple performance parameters to identify one or more performance parameters to take action on, based on the evaluation rules, when the multiple performance parameters exhibit the anomalies.

13. The method as claimed in claim 8, wherein the plurality of performance parameters include an integration middleware node status, an integration middleware service status, a connection status of integration processing server with messaging queues, a software platform virtual machine status, a database status, a database query performance status, a database connectivity status, a performance of messaging threads between various technology platform components, a CPU utilization status, a memory utilization status, a response time for integrations between various platforms or applications within the platform, a connection status between an application and a database, a connection status between a middleware and applications, connection faults between network and a database, a mediation flow status and performance, data related issues stemming from the transaction data, a quality of data in the database, a performance of the middleware queues, and a middleware message transmission status.

14. The method as claimed in claim 8, further comprising implementing, by the processor, a machine learning based evaluation model to evaluate a plurality of remediation action options available to remedy the potential fault.

15. A non-transitory computer readable medium including machine readable instructions that are executable by a processor to:
    monitor transaction data received by a network order fulfillment system having a multi-platform configuration for fulfilling network tasks, the transaction data including transactions pertaining to a plurality of transaction types;
    based on monitoring, determine a real-time status of the transaction data to classify the transaction data into a plurality of alarm types, the classification being based on a pre-defined impact of an alarm type to a given transaction type;
    analyze a plurality of performance parameters corresponding to the transaction data influencing a performance of the network order fulfillment system;
    determine a performance score for service applications of the network order fulfillment system, based on a weighted majority voting of the plurality of performance parameters, wherein the weighted majority voting is based on a decision tree for each of the plurality of the performance parameters;
    identify a performance parameter exhibiting an anomaly, based on historical data, a current status of the plurality of the performance parameters, and a predefined prediction model when the performance score is less than a threshold score;
    when the performance score is less than the threshold score, determine that the performance is being negatively impacted;
    identify the performance parameter from the plurality of performance parameters exhibiting an anomaly, based on a corresponding alarm value;
    ascertain whether the identified performance parameter negatively impacts the performance of the network order fulfillment system, based on evaluation rules; and
    proactively implement a remediation action to remediate a potential fault caused by the identified performance parameter when the identified performance parameter negatively impacts the performance of the network order fulfillment system.

16. The non-transitory computer-readable medium of claim 15, wherein the processor is to:
    analyse the transaction data to determine a volume of incoming transactions and a real-time status of each of the plurality of the performance parameters associated with the transaction data that is being monitored; and
    provide the analysed data for predicting the performance of the network order fulfillment system.

17. The non-transitory computer-readable medium of claim 15, wherein to identify the performance parameter exhibiting the anomaly, the processor is to implement at least one of a Random Forest technique, and a C4.5 technique combined with a regression based prediction approach.

18. The non-transitory computer-readable medium of claim 17, wherein the processor is to:
    implement the Random Forest technique to construct the predefined prediction model;
    implement a linear regression technique to predict an alarm value for each of the plurality of the performance parameters; and
    implement the C4.5 technique to generate a decision tree for each of the plurality of the performance parameters.

19. The non-transitory computer-readable medium of claim 15, wherein the processor is to:
    ascertain whether there are multiple performance parameters exhibiting anomalies;
    correlate the multiple performance parameters to identify one or more performance parameters to take action on, based on the evaluation rules, when the multiple performance parameters exhibit the anomalies.

20. The non-transitory computer-readable medium of claim 15, wherein the plurality of performance parameters include an integration middleware node status, an integration middleware service status, a connection status of integration processing server with messaging queues, a software platform virtual machine status, a database status, a database query performance status, a database connectivity status, a performance of messaging threads between various technology platform components, a CPU utilization status, a memory utilization status, a response time for integrations between various platforms or applications within the platform, a connection status between an application and a database, a connection status between a middleware and applications, connection faults between network and a database, a mediation flow status and performance, data related issues stemming from the transaction data, a quality of data in the database, a performance of the middleware queues, a middleware message transmission status.

* * * * *

UNITED STATES PATENT AND TRADEMARK OFFICE
CERTIFICATE OF CORRECTION

| | |
|---|---|
| PATENT NO. | : 11,502,894 B2 |
| APPLICATION NO. | : 17/094491 |
| DATED | : November 15, 2022 |
| INVENTOR(S) | : Mahesh Kumar Mohan, Madan Kumar and Harshit Kumar |

It is certified that error appears in the above-identified patent and that said Letters Patent is hereby corrected as shown below:

In the Claims

At Claim 1, Column 24, Line 51, the phrase "evaluation rules;" should instead read "evaluation rules; and".

Signed and Sealed this
First Day of August, 2023

Katherine Kelly Vidal
*Director of the United States Patent and Trademark Office*